(12) United States Patent
Stebbings

(10) Patent No.: US 7,644,273 B1
(45) Date of Patent: ***Jan. 5, 2010

(54) MODULATION METHOD FOR MINIMIZING PIRATING AND/OR UNAUTHORIZED COPYING AND/OR UNAUTHORIZED ACCESS OF/TO DATA ON/FROM DATA MEDIA INCLUDING COMPACT DISCS AND DIGITAL VERSATILE DISCS

(75) Inventor: David W. Stebbings, Washington, DC (US)

(73) Assignee: Recording Industry Association of America, Washington, DC (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/315,102

(22) Filed: May 20, 1999

Related U.S. Application Data

(60) Provisional application No. 60/086,132, filed on May 20, 1998.

(51) Int. Cl.
*H04L 9/00* (2006.01)
*G06F 12/14* (2006.01)
*H04N 7/16* (2006.01)
*H04N 7/167* (2006.01)

(52) U.S. Cl. .................... 713/168; 713/194; 726/27; 726/31; 380/239; 380/228; 705/57

(58) Field of Classification Search ............... 713/168, 713/193; 380/201, 31; 705/51, 57
See application file for complete search history.

(56) References Cited

U.S. PATENT DOCUMENTS

| | | | | |
|---|---|---|---|---|
| 4,136,362 A | * | 1/1979 | Naruse et al. ............... 358/128 |
| 4,297,734 A | * | 10/1981 | Laishley et al. ............... 360/78 |
| 4,363,965 A | | 12/1982 | Soberman et al. ........... 250/302 |
| 4,788,685 A | | 11/1988 | Sako et al. .................... 371/38 |
| 4,811,325 A | | 3/1989 | Sharples, Jr. ................. 369/85 |
| 4,862,143 A | | 8/1989 | Hirshfield et al. ........... 340/572 |
| 4,879,704 A | | 11/1989 | Takagi et al. ................. 369/14 |
| 4,930,073 A | * | 5/1990 | Cina, Jr. ...................... 364/300 |

(Continued)

FOREIGN PATENT DOCUMENTS

EP 0545472 A1 * 6/1993

OTHER PUBLICATIONS

Parker, Dana, DVD copyright enforcement and the Video Home Recording Act: Who's right?, Jul. 1996, CD-ROM Professional, pp. 1-2.*

(Continued)

*Primary Examiner*—William R Korzuch
*Assistant Examiner*—Aravind K Moorthy
(74) *Attorney, Agent, or Firm*—Irah H. Donner; Wilmer Cutler Pickering Hale and Dorr LLP

(57) ABSTRACT

The present invention relates to a technique for authenticating data stored on media in order to prevent piracy. According to the present invention, a lookup table contains broken or modified modulation rules comprising one or more authentication keys or components thereof, that are derived by the table's intentional breaking of standard 8-14 and 8-16 modulation rules. The authentication keys are formed and remain hidden without being transferred in the audio/video. Additionally, the lookup table is employed using conventional hardware and/or software in CD or DVD players. Each output value according to the present invention is a function of the physical characteristics of a disc that does not travel with the audio or video or graphics data. Authentication systems of the present invention optionally encompass singular, multiple or multi-level authentication systems, each of which successively must be deciphered before the audio/video is finally available.

52 Claims, 25 Drawing Sheets

U.S. PATENT DOCUMENTS

| | | | | |
|---|---|---|---|---|
| 4,937,679 | A | | 6/1990 | Ryan .......................... 358/335 |
| 4,975,898 | A | | 12/1990 | Yoshida ....................... 369/100 |
| 5,319,735 | A | * | 6/1994 | Preuss et al. ................ 395/2.14 |
| 5,337,357 | A | * | 8/1994 | Chou et al. ...................... 380/4 |
| 5,392,351 | A | * | 2/1995 | Hasebe et al. ................... 380/4 |
| 5,394,274 | A | * | 2/1995 | Kahn .......................... 360/27 |
| 5,408,531 | A | * | 4/1995 | Nakajima ....................... 380/3 |
| 5,412,718 | A | | 5/1995 | Narasimhalu et al. ........... 380/4 |
| 5,418,852 | A | | 5/1995 | Itami et al. ...................... 380/4 |
| 5,418,853 | A | * | 5/1995 | Kanota et al. ............... 380/203 |
| 5,450,489 | A | * | 9/1995 | Ostrover et al. ................. 380/3 |
| 5,473,584 | A | | 12/1995 | Oshima ........................ 369/32 |
| 5,513,260 | A | | 4/1996 | Ryan ............................. 380/3 |
| 5,538,773 | A | | 7/1996 | Kondo ........................ 428/64.1 |
| 5,563,947 | A | * | 10/1996 | Kikinis ........................... 380/4 |
| 5,570,339 | A | | 10/1996 | Nagano ................... 369/275.3 |
| 5,572,507 | A | | 11/1996 | Ozaki et al. .............. 369/275.4 |
| 5,572,589 | A | | 11/1996 | Waters et al. |
| 5,596,639 | A | | 1/1997 | Kikinis ........................... 380/4 |
| 5,608,717 | A | | 3/1997 | Ito et al. .................... 369/275.3 |
| 5,608,718 | A | | 3/1997 | Schiewe .................. 369/275.4 |
| 5,636,276 | A | | 6/1997 | Brugger ......................... 380/4 |
| 5,636,281 | A | | 6/1997 | Antonini ....................... 380/25 |
| 5,646,997 | A | * | 7/1997 | Barton .......................... 380/23 |
| 5,666,411 | A | * | 9/1997 | McCarty ........................ 380/4 |
| 5,699,343 | A | | 12/1997 | Moritsugu et al. .......... 369/124 |
| 5,699,434 | A | * | 12/1997 | Hogan ......................... 380/49 |
| 5,727,092 | A | * | 3/1998 | Sandford et al. ............ 382/251 |
| 5,745,568 | A | | 4/1998 | O'Connor et al. ............. 380/4 |
| 5,761,301 | A | | 6/1998 | Oshima et al. .................. 380/4 |
| 5,768,426 | A | * | 6/1998 | Rhoads ........................ 382/232 |
| 5,822,360 | A | * | 10/1998 | Lee et al. ..................... 375/140 |
| 5,828,754 | A | * | 10/1998 | Hogan .......................... 341/69 |
| 5,841,861 | A | * | 11/1998 | Kondo et al. .................... 380/4 |
| 5,883,957 | A | * | 3/1999 | Moline et al. ................... 380/4 |
| 5,917,910 | A | | 6/1999 | Ishiguro et al. ................. 380/4 |
| 5,930,209 | A | | 7/1999 | Spitzenberger et al. ....... 369/32 |
| 5,930,367 | A | * | 7/1999 | Osawa et al. .................. 380/49 |
| 5,953,417 | A | * | 9/1999 | Quan ......................... 380/203 |
| 5,958,051 | A | * | 9/1999 | Renaud et al. .............. 713/200 |
| 6,005,839 | A | * | 12/1999 | Sako et al. ............... 369/275.3 |
| 6,061,319 | A | * | 5/2000 | Fujiki ...................... 369/59.21 |
| 6,233,684 | B1 | | 5/2001 | Stefik et al. |
| 6,301,663 | B1 | * | 10/2001 | Kato et al. ................... 713/176 |
| 6,311,305 | B1 | * | 10/2001 | Sollish et al. ............... 714/784 |
| 6,345,145 | B1 | * | 2/2002 | Sako et al. ..................... 386/94 |
| 6,349,204 | B1 | * | 2/2002 | Goetz et al. ................. 455/419 |
| 6,353,890 | B1 | * | 3/2002 | Newman .................... 713/193 |
| 6,363,041 | B1 | * | 3/2002 | Timmermans et al. ... 369/47.15 |
| 6,411,772 | B1 | | 6/2002 | Cookson et al. |
| 6,438,692 | B2 | | 8/2002 | Kato et al. |
| 6,473,560 | B1 | * | 10/2002 | Linnartz et al. ............... 386/94 |
| 6,523,113 | B1 | * | 2/2003 | Wehrenberg ................ 713/176 |
| 6,636,689 | B1 | | 10/2003 | Stebbings ..................... 386/94 |
| 6,684,199 | B1 | * | 1/2004 | Stebbings ..................... 705/57 |
| 6,860,429 | B2 | * | 3/2005 | Stebbings et al. ........... 235/494 |
| 7,069,246 | B2 | * | 6/2006 | Stebbings ..................... 705/57 |
| 2004/0052369 | A1 | * | 3/2004 | Stebbings ................... 380/200 |

OTHER PUBLICATIONS

Parker, Dana, DVD copy protection: An agreement at last?, CD-ROM Professional, pp. 1-3.*

PCT International Search Report dated Sep. 2, 1999 in PCT/US99/11190.

* cited by examiner

DISC
PLAYING TIME: 74 MINUTES, 33 SECONDS MAXIMUM
ROTATION: COUNTER-CLOCKWISE WHEN VIEWED FROM READOUT SURFACE
ROTATIONAL SPEED: 1.2-1.4 m/sec.
TRACK PITCH: 1.6 μm
DIAMETER: 120 mm
THICKNESS: 1.2 mm
CENTER HOLE DIAMETER: 15 mm
RECORDING AREA: 46 mm-117 mm
SIGNAL AREA: 50mm-116 mm
MATERIAL: ANY TRANSPARENT MATERIAL WITH 1.55 REFRACTION INDEX, SUCH AS POLYCARBONATE
MINIMUM PIT LENGTH: 0.833 μm (1.2 m/sec.) to 0.972 mm (1.4 m/sec.)
MAXIMUM PIT LENGTH: 3.05 μm (1.2 m/sec.) to 3.56 mm (1.4 m/sec.)
PIT DEPTH: APPROX. 0.11 μm
PIT WIDTH: APPROX. 0.5 μm OPTICAL SYSTEM
STANDARD WAVELENGTH: $\lambda = 780$ nm (7.800A)
FOCAL DEPTH: $\pm 2$ μm
($\lambda/NA \leq 1.75$ μm, NA: NUMERICAL APERATURE)

SIGNAL FORMAT
NUMBER OF CHANNELS: 2 CHANNELS (4-CHANNEL RECORDING POSSIBLE)
QUANTIZATION: 16-BIT LINEAR QUANTIZATION
QUANTIZING TIMING: CONCURRENT FOR ALL CHANNELS
SAMPLING FREQUENCY: 44.1 kHz
CHANNEL BIT RATE: 4.3218 Mb/sec.
DATA BIT RATE: 2.0338 Mb/sec.
DATA-TO-CHANNEL BIT RATIO: 8:17
ERROR CORRECTION CODE: CIRC (WITH 25% REDUNDANCY)
MODULATION SYSTEM: EFM

FIG. 1
PRIOR ART

MODULATION METHOD FOR MINIMIZING PIRATING AND/OR UNAUTHORIZED COPYING AND/OR UNAUTHORIZED ACCESS OF/TO DATA ON/FROM DATA MEDIA INCLUDING COMPACT DISCS AND DIGITAL VERSATILE DISCS

PRIORITY DATA

This application claims priority from U.S. provisional Application No. 60/086,132, filed on May 20, 1998, which is incorporated herein by reference.

FIELD OF INVENTION

This invention relates generally to anti-data pirating technology. More specifically, the invention relates to the use of lookup tables to intentionally break or modify standard modulation rules, such as EFM and 8-16 modulation methods, creating authentication key(s), for preventing piracy and/or unauthorized access and/or unauthorized copying of data, such as audio and/or video data from a data source, such as compact discs (CDs), digital versatile discs (DVDs), hard drive discs, an Internet Service Provider (ISP), and other data discs and/or data sources via direct connection, or via a local and/or global network, such as the Internet.

BACKGROUND OF THE INVENTION

There are two basic methods for recording sound and music—analog and digital. See e.g. Ken C. Pohlmann, "The Compact Disc", THE COMPUTER MUSIC & DIGITAL AUDIO SERIES, Volume 5. The above-mentioned audio series, which was published by A-R Editions, Inc., in Madison, Wis., is, along with all volumes therein, incorporated by reference.

In analog recording, the recording medium (a tape) varies continuously according to the sound signal. In other words, an analog tape stores sound signals as a continuous stream of magnetism. The magnetism, which may have any value within a limited range, varies by the same amount as the sound-signal voltage.

In digital recording, the sound signal is sampled electronically and recorded as a rapid sequence of separately coded measurements. In other words, a digital recording comprises rapid measurements of a sound signal in the form of on-off binary codes represented by ones and zeros. In this digital system, zeros are represented by indentations or pits in a disc surface, and ones are represented by unpitted surfaces or land reflections of the disc, such that a compact disc contains a spiral track of binary codes in the form of sequences of minute pits produced by a laser beam.

Music that is input to a digital recording and the requisite series of reproduction processes, must pass through the recording side of a pulse code modulation (PCM) system. A master recording of the music is stored in digital form on a magnetic tape or optical disc. Once the magnetic tape has been recorded, mixed and edited, it is ready for reproduction as a CD. The CD manufacturer then converts the master tape to a master disc, which is replicated to produce a desired number of CDs. At the end of the PCM system is the reproduction side, the CD player, which outputs the pre-recorded music.

If digital technology is used in all intermediate steps between the recording and reproduction sides of the PCM system, music remains in binary code throughout the entire chain; music is converted to binary code when it enters the recording studio, and stays in binary code until it is converted back to analog form when it leaves the CD player and is audible to a listener. In most CD players, digital outputs therefrom preserve data in its original form until the data reaches the power amplifier, and the identical audio information that recorded in the studio is thereby preserved on the disc.

Optical Storage

The physical specifications for a compact disc system are shown in Prior Art FIG. 1. They were developed jointly by Sony and Philips, and are defined in the standards document entitled *Red Book*, which is incorporated herein by reference. The CD standard is also contained in the International Electrotechnical Commission standard entitled, *Compact Disc Digital Audio System*, also incorporated herein by reference. Disc manufacturers, as well as CD player manufacturers, obtain a CD license to use these specifications.

All disc dimensions, including those pertaining to pit and physical formations, which encode data, are defined in the CD standard. For example, specifications information on sampling frequency, quantization word length, data rate, error correction code, and modulation scheme are all defined in the standard. Properties of the optical system that reads data from the disc using a leaser beam are also defined in the standard. Moreover, basis specifications relevant to CD player design is located in the signal format specifications.

Referring to Prior Art FIG. 2, the physical characteristics of the compact disc surface structure are described. Each CD is less than 5 inches in diameter whose track thickness is essentially thinner than a hair and whose track length averages approximately 3 and a half miles. The innermost portion of the disc is a hole, with a diameter of 15 mm, that does not hold data. The hole provides a clamping area for the CD player to hold the CD firmly to the spindle motor shaft.

Data is recorded on a surface area of the disc that is 35.5 mm wide. A lead-in area rings the innermost data area, and a lead-out area rings the outermost area. Both lead-in and lead-out areas contain non-audio data used to control the CD player. Generally, a change in appearance in the reflective data surface of a disc marks the end of musical information.

A transparent plastic substrate comprises most of the CD's 1.2 mm thickness. Viewing a magnified portion of the CD surface, as shown in Prior Art FIG. 2, the top surface of the CD is covered with a very thin metal layer of generally aluminum, silver or gold. Data is physically contained in pits impressed along the CD's top surface. Above this metalized pit surface and disc substrate lies another thin protective lacquer coating (10 to 30 micrometers). An identifying label (5 micrometers) is printed on top of the lacquer coating.

A system of mirrors and lenses sends a beam of laser light to read the data. A laser beam is applied to the underside of a CD and passes through the transparent substrate and back again. The beam is focused on the metalized data surface that is sandwiched or embedded inside the disc. As the disc rotates, the laser beam moves across the disc from the center to the edge. This beam produces on-off code signals that are converted into, for example, a stereo electric signal.

The Pit Track

Prior Art FIG. 3 shows a typical compact disc pit surface. Each CD contains a track of pits arranged in a continuous spiral that runs from the inner circumference to the outer edge. The starting point begins at the inner circumference because, in some manufacturing processes, tracks at the outer diameter of a CD is more generally prone to manufacturing defects. Therefore, CDs with shorter playing time provide a greater manufacturing yield, which has led to adoption of smaller diameter discs (such as 8 cm CD-3 discs) or larger diameter discs (such as 20 and 30 cm CD-Video discs).

Prior Art FIG. 4 shows a diagram of a typical track pitch. The distance between successive tracks is 1.6 micrometers. That adds up to approximately 600 tracks per millimeter. There are 22,188 revolutions across a disc's entire signal surface of 35.5 millimeters. Hence, a pit track may contain 3 billion pits. Because CDs are constructed in a diffraction-limited manner—creating the smallest formations of the wave nature of light—track pitch acts as a diffraction grating; namely, by producing a rainbow of colors. In fact, CD pits are among the smallest of all manufactured formations.

The linear dimensions of each track on a CD is the same, from the beginning of a spiral to the end. Consequently, each CD must rotate with constant linear velocity (CLV), a condition whereby uniform relative velocity is maintained between the CD and the pickup.

To accomplish this, the rotational speed of a CD varies depending on the position of the pickup. The disc rotates at a playing speed which varies from 500 revolutions per minute at the center, where the track starts, to 200 revolutions per minute at the edge. This difference in speed is accounted for by the number of tracks at each position.

For example, because each outer track revolution contains more pits than each inner track revolution, the CD must be slowed down as it plays in order to maintain a constant rate of data. So, when the pickup is reading the inner circumference of the CD, the disc rotates at the higher speed of 500 rpm. And as the pickup moves outwardly towards the disc's edge, the rotational speed gradually decreases to 200 rpm. Thus, a constant linear velocity is maintained, such that all of the pits are read at the same speed. The CD player constantly reads from synchronization words from the data and adjusts the disc speed to keep the data rate constant.

A CD's constant linear velocity (CLV) system is significantly different from an LP's system. A major difference stems from the fact that a turntable's motor rotates at a constant velocity rate of 33⅓ grooves. This translates into outer grooves having a greater apparent velocity than inner grooves, probably explained by the occurrence that high-frequency responses of inner grooves is inferior to that of outer grooves. If a CD used constant angular velocity (CAV) as opposed to the CLV system, pits on the outside diameter would have to be longer than pits on the inner diameter of the disc. This latter scenario would result in decreased data density and decreased playing time of a CD.

Like constant linear velocity, light beam modulation is also important to the optical read-out system that decodes the tracks. See Prior Art FIG. 5. A brief theoretical discussion on the distinctions between pit and land light travel explains this point.

Generally, when light passes from one medium to another with a different index of refraction, the light bends and its wavelength changes. The velocity at which light passes is important, because when velocity is slow, the beam bends and focusing occurs. Owing to several factors, such as the refractive index, disc thickness and laser lens aperture, the laser beam's size on the disc surface is approximately 800 µm. However, the laser beam is focused to approximately 1.7 µm at the pit surface. In other words, the laser beam is focused to a point that is a little larger than a pit width. This condition minimizes the effects of dust or scratches on the CD's outer surface, because the size of dust particles or scratches are effectively reduced along with the laser beam. Any obstruction less than 0.5 ml are essentially insignificant and causes no error in the readout.

As previously noted, a CD's entire pit surface is metalized. In addition, the reflective flat surface between each pit, (i.e. a land), causes almost 90 percent of laser light to be reflected back into the pickup. Looking at a spiral track from a laser's perspective on the underside of a disc, as shown in Prior Art FIG. 5, pits appears as bumps. The height of each bump is generally between 0.11 and 0.13 µm, such that this dimension is smaller than the laser beam's wavelength (780 nanometers) in air. The dimension of the laser beam's wavelength in air is larger than the laser's wavelength (500 nanometers) inside the disc substrate, with a refractive index of 1.55. In short, the height of each bump is, therefore, one-quarter of the laser's wavelength in the substrate.

Scientifically, this means that light striking a land will travel twice as far than light striking a bump. This discrepancy in light travel distances serve to modulate the intensity of a light beam. This allows data physically encoded on the disc to be recoverable by the laser.

Also, the pits and intervening reflective lands on the disc's surface do not directly designate ones and zeros. Rather, it is each pit's edge, whether leading or trailing, that is a 1 and all areas in between, whether inside or outside a pit, that are designated as zeros. Still, each pit and reflective land lengths vary incrementally. The combinations of 9 different pit and land lengths of varying dimensions physically encode the data.

Error Correction

Error correction is one of the major advantages of digital audio storage media, such as compact discs, over analog media, like LPS. Error correction simply corrects the error.

When you scratch an LP, for instance, the grooves are irrevocably damaged, along with the information contained in them. On every replay of that record, there will be a click or pop when the damaged part of the groove passes beneath the needle.

This is not the case for CDs. The data on every disc is specially encoded with an error correction code. When a scratched CD is played, the CD player uses the error correction code to perform error correction every time the disc is played. Thus, it delivers the original undamaged data, instead of the damaged data.

CD Player Overview

The CD player contains two primary systems: an audio data processing system and a control system. Prior Art FIG. 6 depicts a block diagram of a CD player showing an audio path as well as servo and control functions. Generally, the data path, which directs modulated light from the pickup through a series of processing circuits, consists of several elements that ultimately produces a stereo analog signal. These elements of the data path include a data separator, buffer, de-interleaving RAM, error correction circuit, concealment circuit, oversampling filter, digital-to-analog (D/A) converters, and output filters.

The servo and control system, in addition to a display system, directs the mechanical operation of the CD player, such as the player's spindle drive, and auto-tracking and auto-focusing functions. The servo, control and display system also directs the user interface to the CD player's controls and displays.

A CD player uses a sophisticated optical read-out system to read data, control motor speed, track the pit spiral and adjust pickup positions and timings. While a spindle motor is used to rotate the disc with constant linear velocity, in another servo loop, information from the data itself determines correct rotating speed and data output rate.

User controls and their interface to the player's circuitry is monitored by a microprocessor. A software program controls several modes of player operation. Subcode data is also used to direct the pickup to the proper disc location. For example, a time code is used to locate the start of any track.

Once data is recovered from the CD, the player must go through a series of activities to decode audio information in order to reconstruct an audio signal; namely, the EFM (eight-to-fourteen modulation) data is modulated, and errors are detected and corrected using an error correction algorithm. Additionally, using interpolation and muting, the audibility of gross errors is minimized.

Subsequent to decoding of the audio information, the digital data must be converted to a stereo analog signal. This conversion process requires one or two digital-to-analog (D/A) converters and low-pass filters (in analog or digital domain).

An audio de-emphasis circuit exists in the audio output stages of CD every player. Some CDs are configured for improved signal-to-noise ratio. This configuration is accomplished by encoding the CD with an audio pre-emphasis flag in the subcode, where high frequencies on a master tape is slightly boosted (50/15 µs characteristic). The result, on CD playback, is inverse attenuation of the disc's high frequencies, because the player switches in the de-emphasis circuit when required, so that the signal-to-noise ratio is slightly improved.

The final output circuit is the buffer, which ensures that the CD player's line level output is appropriate to drive necessary external amplifiers with a minimum amount of analog distortion.

Pickup Design

With respect to a player's pickup design, a CD may contain as many as three billion pits, all orderly arranged on a spiral track. Each optical read-out system, which comprises an entire lens assembly and pickup, must focus, track and read data stored on a spiral track. The lens assembly, which is a combination of the laser beam and a reader, must be small enough to move across the underside of a disc in response to tracking information and user random-access programming. Moreover, movement of the pickup from a CD's center to its edge must be focused despite adverse playing conditions, such as when a CD is dirty or vibrating.

Auto-Tracking

Unlike an LP, which has grooves to guide the pickup, a CD has a singular spiral pit track running from a center circle to its outer edge. The only object that touches the disc surface is an intensity-modulated laser light, which carries data and which is susceptible to obstructions, such as vibrations. Four standard methods have been designed for tracking pit spiral: (1) one-beam push-pull; (2) one-beam differential phase detection; (3) one-beam high frequency wobble; and (4) three-beam.

Auto-Focusing

The optical pickup must be precise in order to accommodate approximately 600,000 pits per second. Even the flattest disc is not perfectly flat; disc specifications acknowledge this by allowing for a vertical deflection of ±600 µm. In addition, a ±2 µm tolerance is required for the laser beam to stay focused, otherwise the phase interference between directed and reflected light is lost, along with audio data, tracking and focusing information. Therefore, the objective lens must be able to re-focus while the disc's surface deviates vertically.

An auto-focus system, driven by a servo motor, manages this deviation, using control electronics and a servo motor to drive the objective lens. Three techniques are available for generating a focusing signal: (1) a cylindrical lens using astigmatism; (2) a knife edge using Foucault focusing; and (3) critical angle focusing.

Any pickup must perform both tracking and focusing functions simultaneously. Therefore, a completed pickup design would use a combination of the above-mentioned auto-tracking and auto-focusing techniques. Two standard pickup designs stand out from the rest when auto-tracking and auto-focusing functions are combined: (1) one-beam push-pull tracking with Foucault focusing, (hereinafter "one-beam pickup"); and (2) three-beam tracking with astigmatic focusing, (hereinafter "three-beam pickup").

Both of these designs have been commercialized among manufacturers. One-beam pickups, which are usually mounted on a distal end of a pivoting arm, swings the pickup across a disc in an arc. On the other hand, three-beam pickups are mounted on a sled, which slides linearly across the disc.

The following prior art discussion will be limited to three-beam pickups only.

Three-Beam Pickup Optical Design

Prior Art FIG. 7 shows the optical path of a three-beam pickup, which uses a laser as the light source. A laser is used, rather than a bulb, for a number of reasons. First, a laser uses an optical resonator to stimulate atoms to a higher energy level that induces them to radiate in phase, a condition necessary to achieving sharper data surface focus and proper intensity modulation from the pit height.

Second, a laser light, unlike a bulb's light, which radiates all the frequencies of a spectrum at all different phases, is composed of a single frequency and is coherent in phase. An important advantage of phase coherency is phase cancellation in the beam that is produced by disc pits, so that disc data can be read. Most CD pickups use an aluminum gallium arsenide semiconductor laser with a 0.5 milliwatt optical output that radiates a coherent-phase laser beam with a 780 nanometer wavelength; the beam is comprised of near-infrared light.

Referring to Prior Art FIG. 7, a laser diode is positioned adjacent the focal point of a collimator lens with a long focal distance, for the purpose of making the divergent light rays parallel. A monitor diode (not shown) is also placed adjacent the laser diode in order to control power to the laser. The monitor diode stabilizes the laser's output in two important ways; first, by compensating for temperature changes so as to prevent thermal runaway; and second, by conducting current in proportion to the light output of the laser.

The three-beam pickup is so termed because it uses three beams for tracking and reading a CD. To generate these beams, a laser light first passes through a diffraction grating, which resembles a screen with evenly-spaced slits of a few laser wavelengths apart. As the beam passes through the grating, the light diffracts into fringes of parallel light beams. When the collection of these beams is re-focused, the collection appears as a single, bright centered beam with a series of successively less intense beams on either side of the center beam.

It is this diffraction pattern that actually strikes the CD, where the center beam is used for both reading data and focusing. In a three-beam pickup, two of the series of successively less intense beams, or two secondary beams, are used for tracking only. In a one-beam pickup, data reading, focusing and tracking is accomplished with just one beam.

Another element in the three-beam optical design is the polarization beam splitter, or PBS, which consists of two prisms having a common 45 degree facing that acts as a polarizing prism. The purpose of the PBS is to direct the laser light to the disc, and to angle the reflected light (from the disc) to the photosensor. In some designs, a half-silvered mirror is used.

In Prior Art FIG. 7, the collimator lens is shown as following the PBS, even though it can precede the PBS in other designs. Once the light exits the collimator lens, it then passes through a quarter-wave plate (QWP). The QWP is an anisotropic material that exhibits properties with different values when measured in different directions, so that when light passes through the QWP, it rotates the plane of polarization of each passing light beam. This rotation is required to make the PBS work.

The anisotropic quality of the quarter-wave plate is equally important to the process occurring on the right-hand side of the plate. Light passing through the QWP to the CD, will be reflected from the CD back again through the QWP and become polarized. More importantly, the light is polarized in a plane at right angles to that of the incident light.

In other words, the reflected polarized light re-entering the quarter-wave plate (from right to left) will pass through the collimator and strike the polarization beam splitter. Because the polarization beam splitter passes light in one plane only (e.g., horizontally) but reflects light in the other plane (e.g., vertically), the PBS will properly deflect the reflected beam toward the photodiode sensor to read the digital data.

The final optics element in the path to the CD is the objective lens. The objective lens is used to focus laser beams into a convergent cone of light onto the CD's data surface, taking into account the refractive index of the polycarbonate substrate of the disc. Convergence is a function of the numerical aperture (NA) of the lens, with most pickups using an objective lens having an NA of about 0.5.

As mentioned earlier, the laser beam's size on the outer surface of the CD's transparent polycarbonate substrate is approximately 800 micrometers in diameter. Since the refractive index of the substrate is 1.55 and its thickness is 1.2 millimeters, the laser beam's size is narrowed to 1.7 micrometers at the reflective surface, a size slightly wider than the pit width of 0.5 micrometer and comparable in width to the light's wavelength.

When the laser beam strikes a land, (the smooth surface between two pits), light is almost totally reflected. When the light strikes a pit (viewed as a bump by the laser), diffraction and destructive interference cause less light to be reflected.

In short, all three intensity-modulated light beams pass through the objective lens, the QWP, collimator lens, and the PBS. Before hitting the photodiode, they pass through a singlet lens and a cylindrical lens.

In any optical pickup system, automatic focusing is an absolute prerequisite. Disc warpage and other irregularities causes vertical deflections in the CD's data surface. Such movement would place the data out of the pickup's depth of focus, essentially making it impossible for the pickup to distinguish between pit height and land phase differences.

The unique properties of astigmatism are used to achieve auto-focusing in a three-beam CD player. This is illustrated in Prior Art FIG. 8.

The cylindrical lens, (see Prior Art FIG. 7), which prefaces the photodiode array, detects an out-of-focus condition. The condition is directly related to the distance between the objective lens and the CD's reflective surface. As this distance varies, the focal point changes, and the image projected by the cylindrical lens changes its shape. The inter-relationship of the above elements is illustrated in Prior Art FIG. 8.

Changes in an image on the photodiode generates a focus correction signal. For example, when the distance between the objective lens and the CD decreases, the image projected by the lens moves further from the cylindrical lens, and the pattern becomes elliptical. Conversely, when the distance between the objective lens and the CD increases, the image projected by all lenses (e.g., the objective lens, an intermediate convex lens and the cylindrical lens) moves closer to the lens. However, the elliptical pattern that is formed is now rotated 90 degrees from the first elliptical pattern.

In the third and final scenario, which is when the disc surface lies exactly at the focal point of the objective lens, the image reflected through the intermediate convex lens and cylindrical lens is unchanged, and a circular spot strikes the center of the photodiode.

An important aspect of the three-beam auto-focus system is correction voltages. A photodiode uses a laser beam's intensity level to generate a focus correction voltage, which in turn generates a control signal. These electrical signals control the mechanical motion of a servo motor, which is responsible for moving the objective lens along an optical axis in response to any vertical disc motion. Servo-controlled movement of the objective lens during disc motion results in automatic focusing.

Prior Art FIG. 9 illustrates a typical servo motor used to move the objective lens in the optical path. The servo motor consists of a coil and magnet structure generally used in loudspeakers.

Operation of a CD player begins when a CD is first loaded into the player. Technically, an electrical control signal is sent into the optical pickup system, which causes the laser to turn on, and the objective lens to move vertically until a focus condition is reached.

Then, the auto-focusing system takes over, except if two negative situations occur. If no CD is detected, the automatic focusing system tries again, and cuts off if it fails to detect a CD again. If the auto-focus is inoperative, such as when the CD tray is open, the system pulls back the objective lens to prevent damage to the lens or CD. Otherwise, the automatic focusing system performs its operation smoothly by keeping the pickup properly positioned beneath the spinning disc, in effect maintaining focus to within a tolerance of approximately ±0.5 micrometers.

Content Scrambling System

Currently, encryption for data media, such as DVDs, involves one key. It is a fairly simple 40-bit scheme. There is good authentication of the platform, which is performed by various key exchanges within the mechanisms between the source drive and the actual platform decrypting the data.

A content scrambling system (CSS) is included in every DVD player. CSS is a method of encrypting a disc that the information technology (IT) and motion picture industries agreed upon. In order to be a licensed to manufacture DVD players, a company is required to obey certain rules pertaining to the uses (and non-uses) that a platform can perform, as part of a license agreement. A company must be a licensee under CSS in order to build a player of any form.

While the present invention is not required to incorporate the CSS encryption system, it could be one level of encryption, if a multi-level encryption is employed. Audio information is generally encrypted prior to being burned into a disc, such as a CD. Hence, there is no plain text; encrypted information only is contained on a CD. So, if a user seeks to access information contained on the CD, whether for listening or copying purposes, the user would have to decrypt the data in order to hear sensible audio data.

In general, existing ideas in the field appear to bury authentication keys within encrypted information that is burned into the disc. Authentication keys are buried using various authentication processes, which verify that the platform device—whether a computer, CD player, DVD player, or the like—is a licensed device and, consequently, obeys certain copyright rules. Eventually, the licensed device uncovers the buried authentication key(s) and decrypts the data contained on the disc. So, the system needs to find the key before being eligible for deciphering the audio data.

The following prior patents represent the state of the art of preventing unauthorized copying of data, and are all hereby incorporated by reference:

U.S. Pat. No. 4,811,325 to Sharples, Jr. et al. discloses a high speed copying of audio programs on optical CDs. The master CD is encoded using Adaptive Delta Modulation (ADM).

U.S. Pat. No. 4,879,704 to Takagi et al. prevents copying of an optical disc. Data is stored in a record protected area and in a record unprotected area, where each such sector has a representative address that helps to determine whether the data is in the record protected area or in the record unprotected area. Only data from the record unprotected area with an appropriate address can be copied.

U.S. Pat. No. 4,937,679 to Ryan discloses a video recording and copy prevention system. The video signal includes a copy-protect signal. Designated detectors detect the presence of copy-protected signal(s) and inhibit copying of such signals. A video correlate enables one to playback a copy-protected program for viewing only and generates an inhibit signal to prevent copying of a copy-protected signal.

In U.S. Pat. No. 4,975,898 to Yoshida, an erasing program erases the non-rewritable portion so that it cannot be copied on a copy disc during unauthorized copying of an optical disc.

U.S. Pat. No. 5,319,735 to Preuss et al. uses a digital code signal embedded with the original audio signal. The digital code gets transferred to the copy disc.

In U.S. Pat. No. 5,412,718 to Narashimhalu et al., non-uniformities and their attributes in the storage medium is used as a unique signature. This signature is used to derive a key for encrypting the information on the storage medium. During copying, the signature gets mutated and the information cannot be decrypted. During authorized copying, the information is decrypted by generating a key from the signature of the distribution medium.

In U.S. Pat. No. 5,418,852 to Itami et al., data is stored in a user accessible area and in a user inaccessible area, which are both compared to determine the authenticity of the recording medium.

In U.S. Pat. No. 5,513,260 to Ryan, copy-protected CDs have authenticating signature recorded on them. An authentication signature is obtained by a deliberately induced radial position modulation giving an error voltage corresponding to the elliptical errors. When playing the CD, the signature causes the player to correctly decrypt the program whereas, when playing an unauthorized copy of the CD, the absence of the signature is detected and false data is generated and the player does not play.

U.S. Pat. No. 5,538,773 to Kondo discloses the recording of data together with a cipher key information for copy protection.

U.S. Pat. No. 5,570,339 to Nagano discloses a system that converts data to digital data, which is then FM modulated with key information to vary the widths of the pits at the time of recording. During reproduction, the data is read out and if the key information is determined to be missing, copying is prevented.

U.S. Pat. No. 5,608,717 to Ito et al. discloses a CD-ROM that has a character/graphic pattern for copy protection. Password and information on the position of the character/graphic pattern bearing area of the CD-ROM are stored beforehand in a memory included in the CD-ROM's controller of the playback system. The CD-ROM controller, therefore, will have the means for deciphering the enciphered password. Data modulated by the EFM modulation method into bits of predetermined width and height having values corresponding to the EFM.

U.S. Pat. No. 5,608,718 to Schiewe discloses an optical disc having shallow pits bearing an identification/logo/watermark. The lands and pits are of different lengths for identification/authorization purposes when copying a CD.

U.S. Pat. No. 5,636,276 to Brugger discloses the distribution of digital music with copyright protection. An encryption table is embedded in the music CD player and includes a decryption module that uses the encryption table for authorized playing of music/information.

U.S. Pat. No. 5,636,281 to Antonini discloses an authorized access that uses mingling of data elements of the program memory to be protected according to a secret order. To use this memory, a transconding device is used. The transcending device is in the form of a memory containing several tables, only one of which gives the right transconding data elements.

One problem with one or more of the above-mentioned conventional encryption/decryption systems is that a pirate or hacker seeking to hack into the encryption process on a disc could do so by playing the encrypted music, finding the decryption key, which is buried, mixed and interleaved with the audio data or the encrypted audio data, and using that key to decrypt the audio on the disc.

In other words, accompaniment of the decryption key within the audio data lends itself to discovery, even if the audio data is played in an encrypted form. A hacker could obtain decryption key(s) even if the encrypted audio data was placed onto an unlicensed computer platform having a DVD ROM drive that did not obey copyright protection rules, because if the audio is later played back, the key would be output along with the encrypted audio data.

An additional problem in one or more of the prior art references is that keys specific to, or derived from, the physical construction of the CD are not constructed or determined in a manner that is difficult to detect by a hacker. A further problem in the prior art is that the physical characteristics of the CD which are used to derive a key for authorized copying, are transferred in the audio and may be accessible to the hacker.

Yet another problem in one or more of the prior art references is that the solutions proposed therein require significant additional hardware and/or software to be implemented. That is, these prior art techniques do not take advantage of existing hardware/software within the CD or DVD player that can be used effectively to prevent unauthorized copying.

Yet another problem in one or more of the prior art references is that the solutions proposed therein are expensive, and incompatible with existing CD or DVD players. Hence, current solutions to unauthorized copying are difficult and impractical in their implementation.

Yet another problem in one or more of the prior art references is that the solutions proposed therein are limited to CD and/or DVD players, and does not consider or structure such techniques when data is transmitted from, to, and/or over local and/or global networks, such as the Internet.

SUMMARY OF THE INVENTION

It is a feature and advantage of the present invention to provide a method and/or apparatus for minimizing pirating of, or unauthorized access to, data on a data media that is inexpensive, and compatible with existing CD and/or DVD players, and other forms of data recording and/or playing devices.

It is another feature and advantage of the present invention to provide a method and/or apparatus for minimizing pirating of, or unauthorized access to, data on a data media that is manageable and practical in its implementation.

It is another feature and advantage of the present invention to provide a method and/or apparatus for minimizing pirating of, or unauthorized access to, data on a data media that does not require significant additional hardware and/or software in its implementation.

It is another feature and advantage of the present invention to provide a method and/or apparatus for minimizing pirating of, or unauthorized access to, data on a data media that uses and/or adapts existing hardware/software within, for example, the CD or DVD player that can be used effectively to prevent unauthorized copying.

It is another feature and advantage of the present invention to provide a method and/or apparatus for minimizing pirating of, or unauthorized access to, data on a data media that uses or creates data keys specific to, or derived from, the physical construction of the CD in a manner that is difficult to detect by a hacker.

It is another feature and advantage of the present invention to provide a method and/or apparatus for minimizing pirating of, or unauthorized access to, data on a data media that uses the physical characteristics of the CD or other data disc/data media to derive a key for authorized copying, and which key is prevented from being transferred in the audio and, therefore, not accessible to the hacker.

The present invention relates generally to a method/system of preventing unauthorized copying of data on data media, including CDs and DVDs. Generally, an authorized CD is designed to require decoding by an authorized disc player. The authorized CD includes certain information used by an authorized CD player for playing music. An unauthorized copied CD, however, does not have the requisite encryption/decryption key(s) necessary for decoding.

Consequently, a feature and advantage of the present invention is to prevent piracy of audio and/or video data or other data from discs or other data media; that is, to provide greatly enhanced security measures against data pirating. The present invention is based, in part, on my discovery that the authorization key(s) need not necessarily be transferred in the audio using conventional hardware and/or software in CD or DVD players that may be adapted in one or more ways described below.

The above features and advantages are accomplished generally by using a look-up table, which is a table of authentication keys stored on a data media memory device, such as a CD, in conjunction with, for example, a standard 8-16 or 8-14 modulation system as a method for embedding authentication key(s) on the signal surface of a disc, and in conjunction with a detector, which detects modulation resulting from breaking or modifying standard modulation rules.

Singular or multi-level authentication systems may be used for preventing unauthorized copying of audio data on a disc. Similarly, two or three different authentication systems, each of which successively must be authenticated before the audio is finally available, may also be used.

Advantageously, the present invention optionally uses three or four different sources for making or compiling a long or compound keys. Thus, in other words, instead of, or in addition to, having a multi-layered authentication system, the present invention optionally includes a multi-level authentication key, each component of which must be found in order to build the whole key to perform the entire authentication process.

According to the present invention, a look-up table is employed to intentionally break or modify standard eight-to-fourteen and eight-to-sixteen modulation rules. Intentional breaking/modifying results in broken or modified rule output values that comprise authentication key(s) or components thereof. A method authenticates the media and/or the data stored on the media, in order to prevent piracy and/or unauthorized access and/or unauthorized copying of the data stored on the media.

A further advantage of the present invention is that the authentication keys are optionally embedded in the data disc on a per track basis, or at intervals throughout the disc. This means that the same type of authentication process may be performed for each track to be played, or may be performed through the playing/recording process. Each track of a CD can optionally include a different authentication key.

To achieve these and other objects, the present invention provides a computer program product that stores computer instructions thereon for instructing a computer to perform a process of authenticating a data media, such as a CD or DVD, as fraudulent/pirated or non-fraudulent.

In accordance with one embodiment of the invention, a method authenticates at least one of a media and data stored on the media in order to prevent at least one of piracy, unauthorized access and unauthorized copying of the data stored on the media. Each broken modulation rule output value, which is derived from a physical characteristic of a data disc, is introduced with the original data stored on the data disc. Each output value includes at least one authentication key or at least one component of an authentication key, for authenticating whether the media and/or data is authorized.

The method includes the following sequential, non-sequential and/or sequence independent steps: (a) reading the data from the media; (b) detecting the modulation of at least one broken modulation rule output value; (c) deriving an embedded authentication key or component thereof responsive to detecting step (b); (d) comparing the embedded authentication key or component thereof, to at least one authentication key or component thereof; (e) authenticating at least one of the media and the data responsive to comparing step (d); and (f) outputting data as at least one of audio, video, audio data, video data and digital data substantially free of the modulation of at least one broken modulation rule output value.

The method also includes the steps of: (g) locating each broken modulation rule output value on at least one of a per track basis and interval basis throughout said media such that said authentication step (e) is performed for at least one of each track to be played, throughout playback and throughout recording; and converting said data into a stereo analog signal without transferring, in the data, the modulation of each broken rule output value used to derive the embedded authentication key or component thereof.

In accordance with another embodiment of the present invention, a data player includes a data processor performing the steps of: (a) reading the data from the media; (b) detecting the modulation of at least one broken modulation rule output value; (c) deriving an embedded authentication key or component thereof responsive to detecting step (b); and (d) comparing the embedded authentication key or component thereof, to at least one authentication key or component thereof. The data player authenticates the media and/or data responsive to comparing step, and outputs data as either audio, video, audio data, video data and digital data substantially free of the modulation of each broken modulation rule output value.

According to another embodiment of the invention, a data message comprises at least one authentication key, or component thereof, formed by modulation via at least one lookup table used to create broken modulation rule output values. These values comprise the authentication key or component thereof for authenticating whether a data message is authenticated. The modulation of each broken rule output value cannot be readily altered, obscured nor removed from the data message without simultaneously degrading or impairing a quality of an audible component of the data message, such that the data message is transmitted substantially free of the modulation of each broken rule output value thereby preventing a destination processor from reading and subsequently authenticating the data message.

According to another embodiment of the invention, a data disc comprises media containing the modulation of each broken rule output value comprising at least one authentication key or component thereof for authenticating whether at least one of the media and/or data is authenticated.

A computer or processor driven system, tangible medium including instructions thereon, and a process is also provided.

There has thus been outlined, rather broadly, the important features of the invention in order that the detailed description thereof that follows may be better understood, and in order that the present contribution to the art may be better appreciated. There are, of course, additional features of the invention that will be described hereinafter and which will perform the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be used as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public, generally, and especially scientists, engineers and practitioners in the art, who are not familiar with patent or legal terms or phraseology, to determine quickly from a cursory inspection, the nature and essence of the technical disclosure of the application. The abstract is neither intended to define the invention of the application, which is measured by the claims, nor is it intended to be limiting as to the scope of the invention in any way.

The objects of the invention, together with other apparent objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompanying drawings and descriptive matter, which illustrate preferred embodiments of the invention.

BRIEF DESCRIPTION OF THE DRAWINGS

FIG. 1 shows a conventional specification table for a conventional compact disc system.

The same reference numerals refer to the same parts throughout the various figures.

NOTATIONS AND NOMENCLATURES

Figure 2:
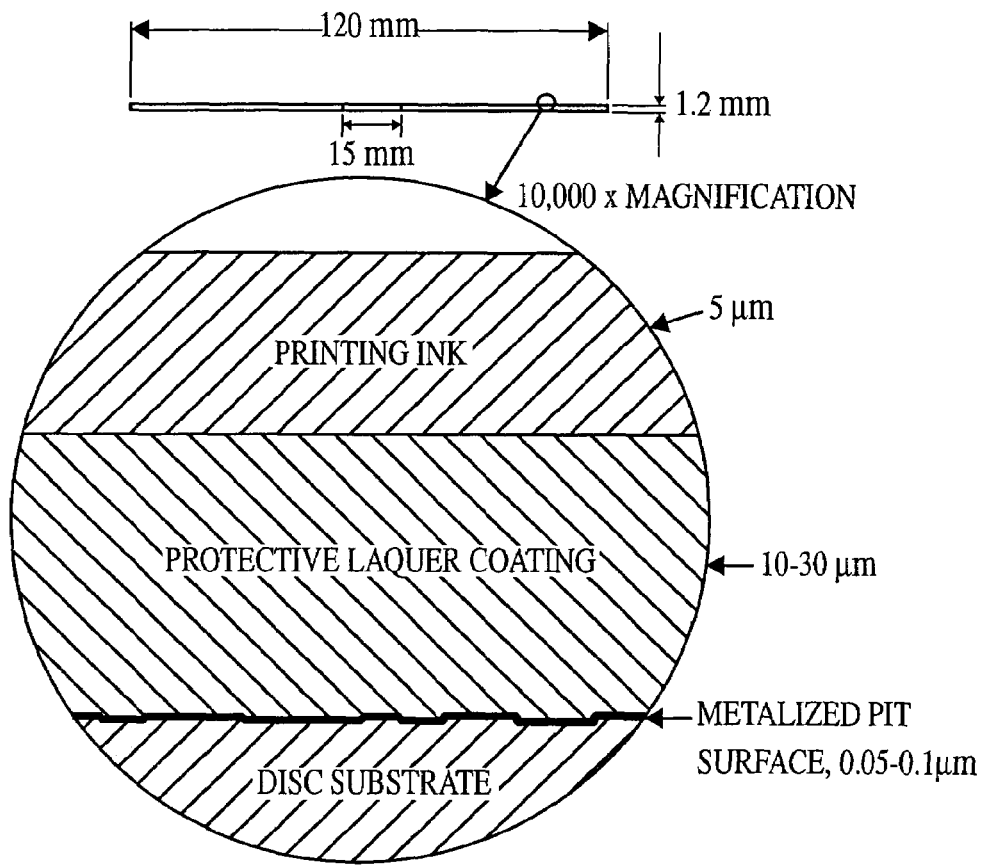
FIG. 2 shows a scale drawing of a conventional CD data surface.
Figure 3:
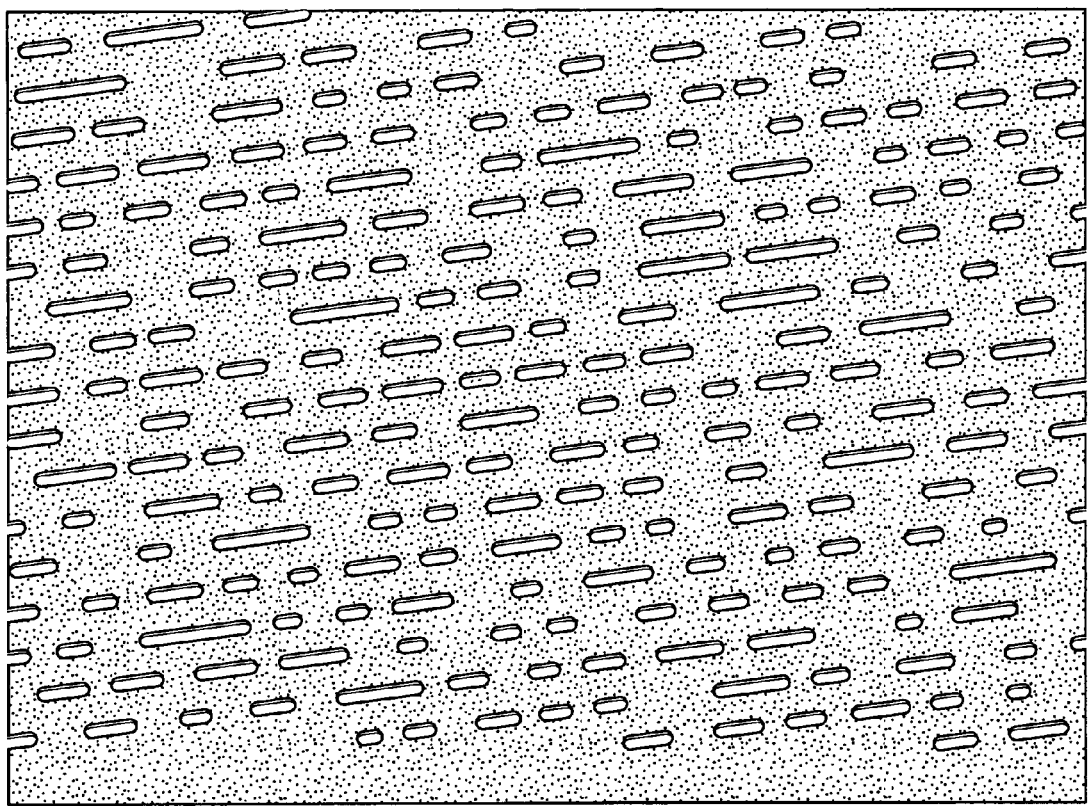
FIG. 3 shows a typical compact disc pit surface.
Figure 4:
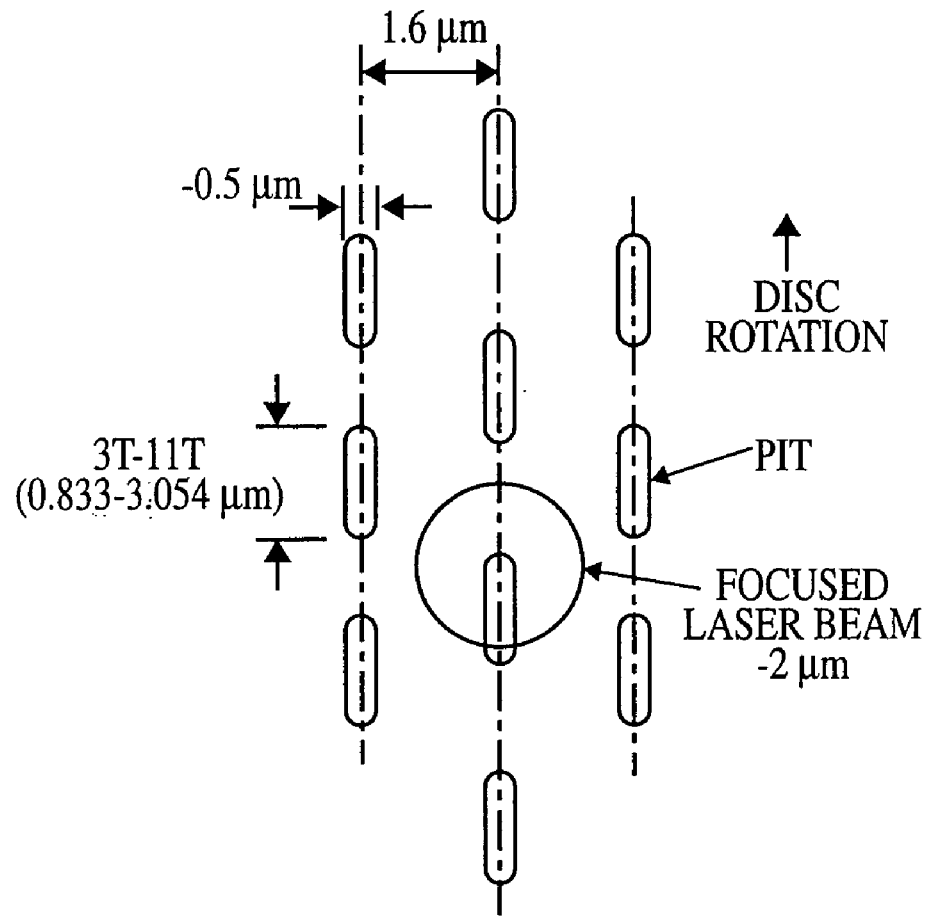
FIG. 4 shows a diagram of a conventional pit track.
Figure 5:
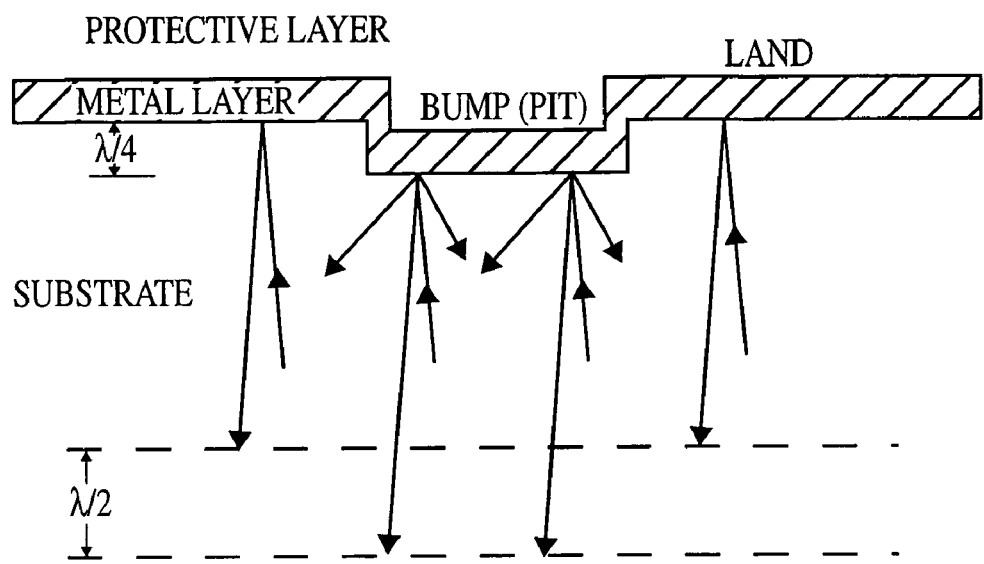
FIG. 5 shows a conventional bump height on a CD surface.
Figure 6:
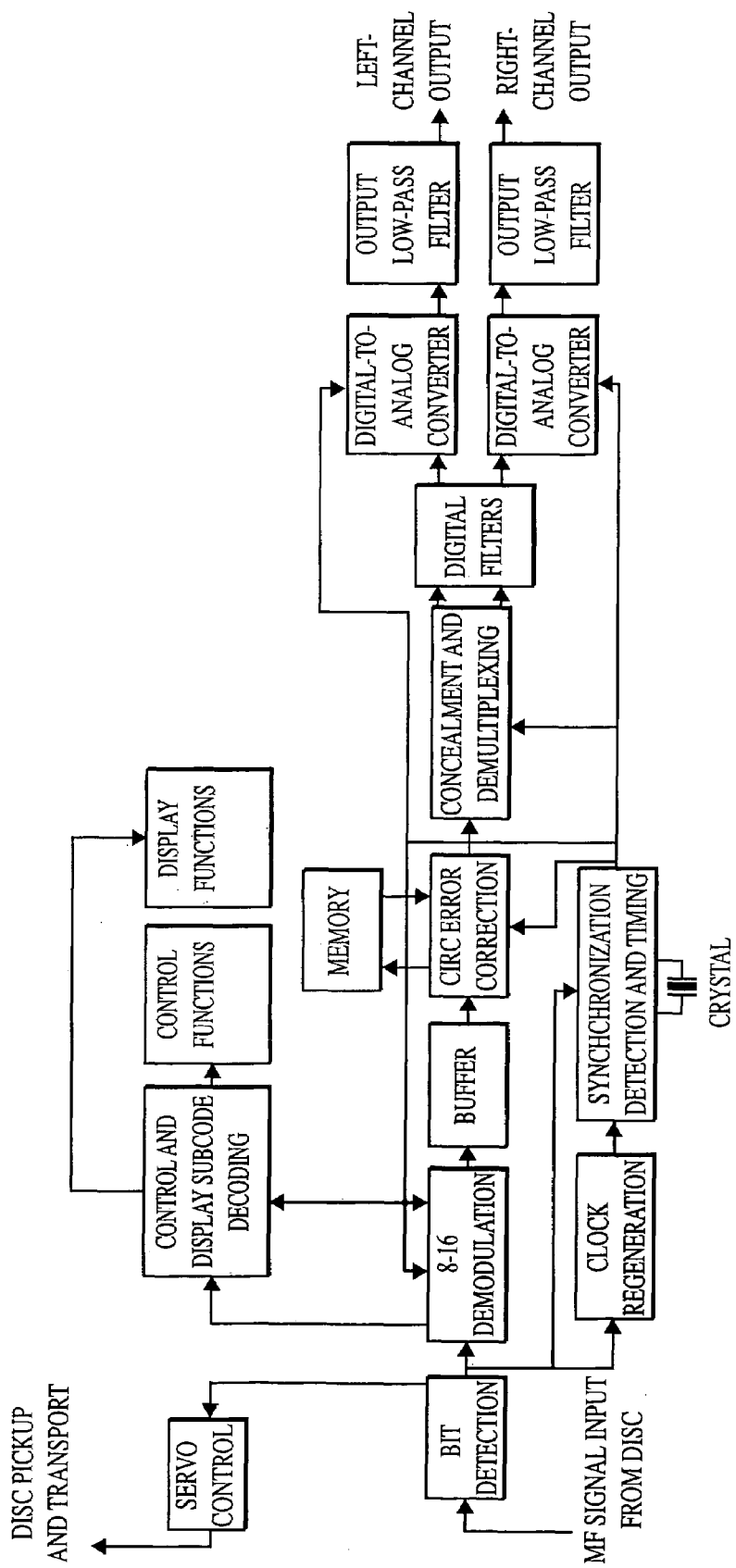
FIG. 6 shows a block diagram of a conventional CD player showing audio path as well as servo and control functions.
Figure 7:
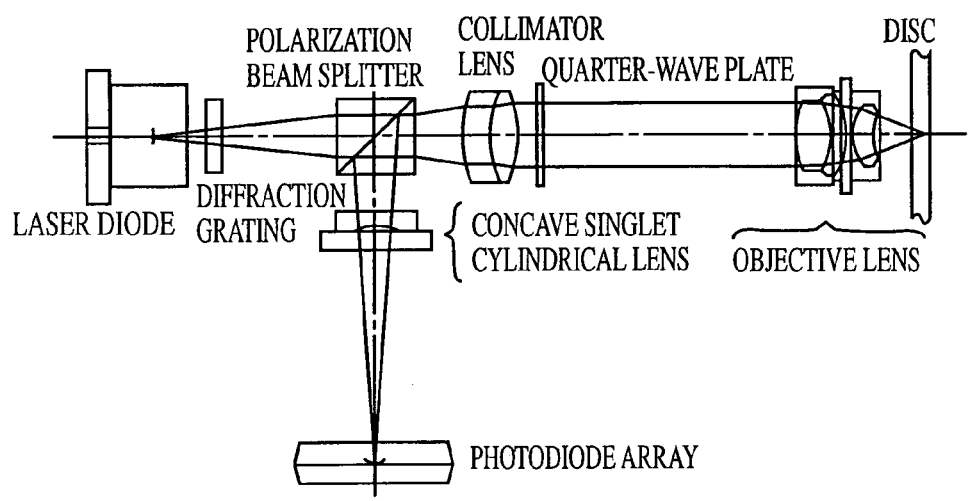
FIG. 7 shows an optical path of a conventional three-beam pickup system.
Figure 8:
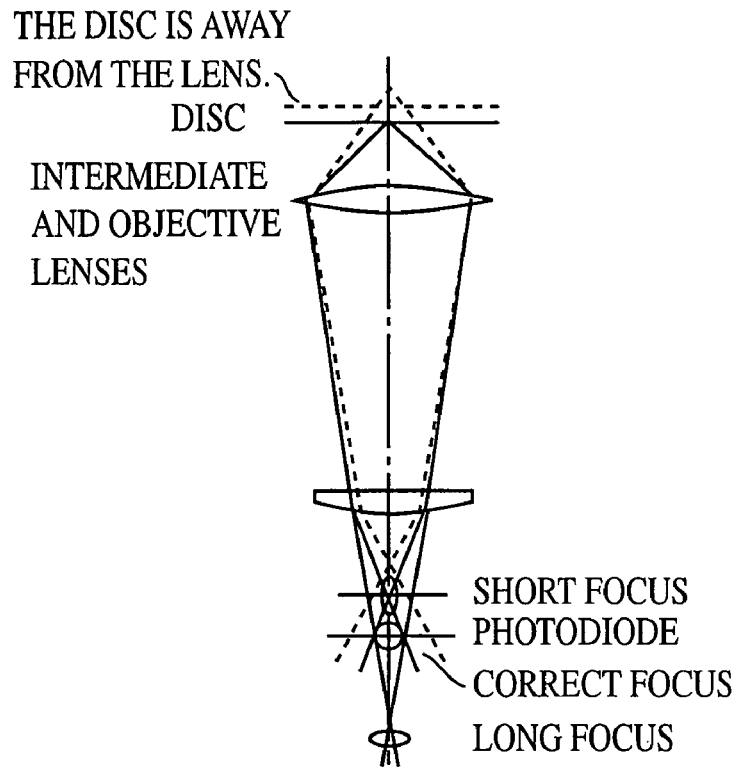
FIG. 8 shows the properties of astigmatism used to generate an auto-focus correction signal in a conventional three-beam pickup system.
Figure 9:
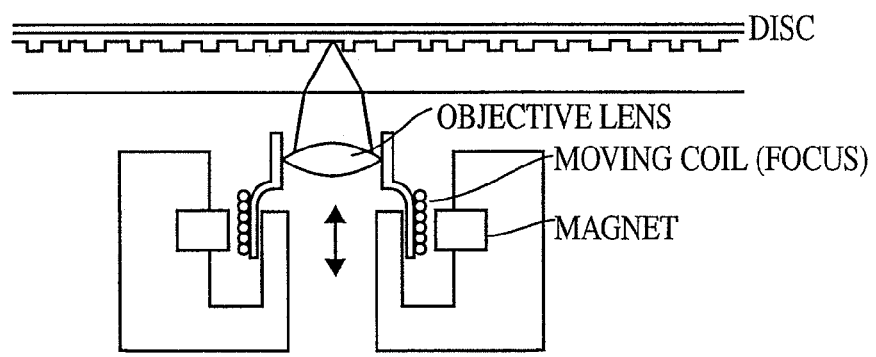
FIG. 9 shows a conventional servo motor used to move the objective lens in an optical path.

The detailed description that follows may be presented in terms of program procedures executed on a computer or network of computers. These procedural descriptions and representations are the means used by those skilled in the art to most effectively convey the substance of their work to others skilled in the art.

A procedure is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operation of the present invention include general purpose digital computers or similar devices.

The present invention also relates to an apparatus for performing these operations. This apparatus may be specially constructed for the required purpose or it may comprise a general purpose computer as selectively activated or reconfigured by a computer program stored in a computer. The procedures presented herein are not inherently related to a particular computer or other apparatus. Various general purpose machines may be used with programs written in accordance with the teachings herein, or it may prove more convenient to construct more specialized apparatus to perform the required method steps. The required structure for a variety of these machines will appear from the description given.

DETAILED DESCRIPTION OF THE PREFERRED EMBODIMENTS

The present invention relates to a method and system for minimizing pirating and/or unauthorized copying and/or unauthorized access to data on data media, including CDs and DVDs. Generally, an authorized CD, or other data media, is designed to require decoding by an authorized disc player. The authorized CD, for example, includes certain information used by an authorized CD player for playing music. An unauthorized copied, formed or pressed CD, however, does not have the requisite encryption or decryption key(s) necessary for decoding.

Consequently, a feature and advantage of the present invention is to prevent piracy of audio and/or video data from discs; that is to provide greatly enhanced security measures against CD or DVD pirating.

The present invention is based, in part, on my discovery that the authentication key(s) need not necessarily be transferred in the audio/video using conventional hardware and/or software in CD or DVD players that may be adapted in one or more ways described below.

In the present invention, this is accomplished by using lookup table(s) to intentionally break or modify standard eight-to-fourteen or eight-to-sixteen modulation rules by which bit patterns are recorded as one symbol sequence on a data disc. In the eight-to-fourteen modulation system, for example, the lookup table intentionally breaks or modifies the rules in a predetermined manner by which 3 merging bits are added to 14 EFM bit patterns in order to form 17-channel bit patterns. And each broken rule value is cut into the disc at recording.

Singular or multi-level authentication systems may be used for preventing unauthorized copying of audio data or other data on a disc. Similarly, two or three different authentication systems, each of which successively must be deciphered before the audio/video is finally available, may also be used.

Advantageously, the present invention optionally uses three or four different sources for making or compiling a long or compound authentication keys. Thus, in other words, instead of, or in addition to, having a multi-layered decryption or authentication system, the present invention optionally includes a multi-level authentication key, each component of which must be found in order to build the whole key to perform the entire authentication process.

According to the present invention, use of the lookup table can be employed in both the eight-to-fourteen (EFM) modulation system, typically used for CDs, and in the eight-to-sixteen modulation system, typically used for DVDs or other similar modulation schemes. Use of the lookup table to produce authentications keys is generally a function of the physical characteristics of a disc that do not normally travel with the audio or video or graphics data.

A further advantage of the present invention is that a broken or modified rule value can be cut into a disc on a per track basis or at intervals throughout the disc. This means that the same type of authentication process may be performed for each track to be played, or may be performed throughout the playing or recording process. Thus, it is important to note that each track of a CD or DVD can optionally include a different authentication key.

Figure 10:
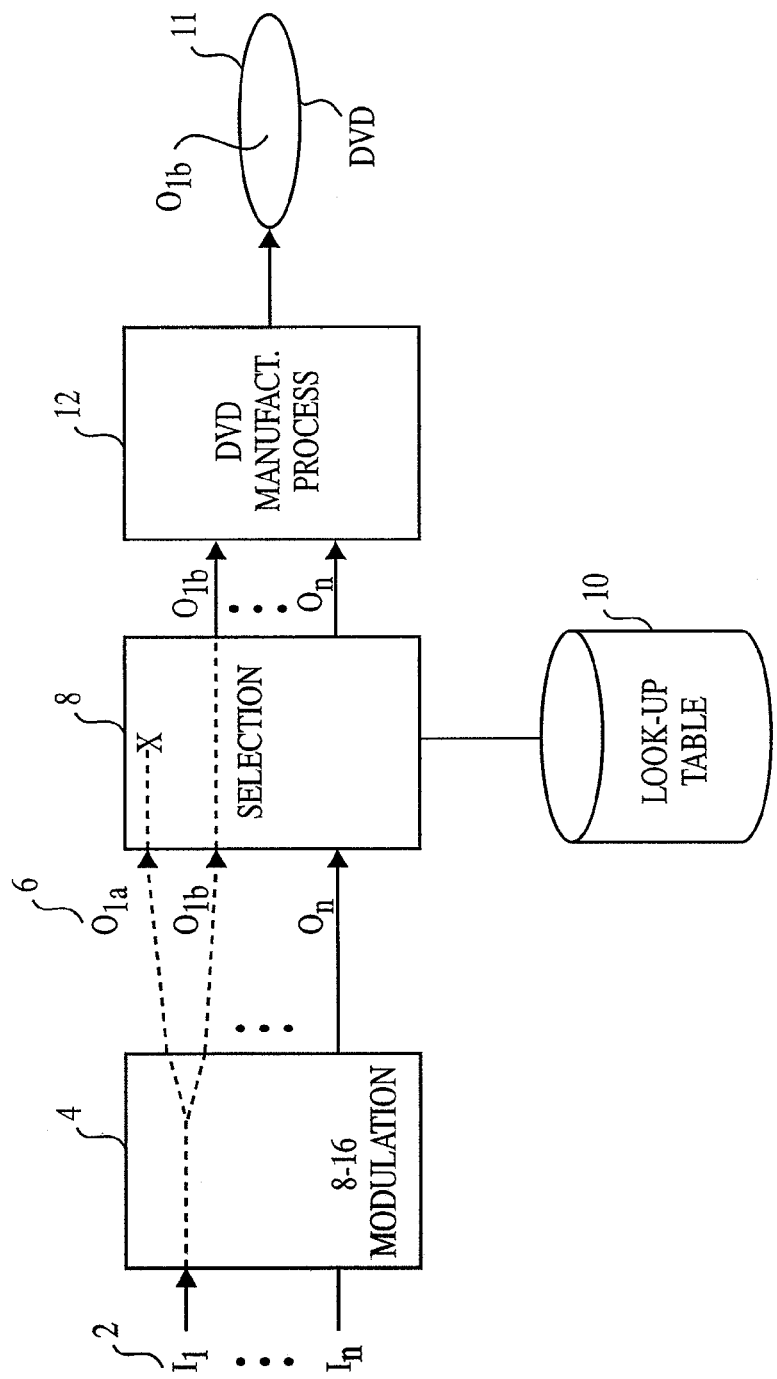
FIG. 10 is a block diagram employing use of a look-up table embodying a modulation technique according to the present invention, during the manufacturing process of a data disc.

FIG. 10 is a block diagram by which a broken/modified rule value is derived and recorded into the signal surface of a data disc, such as a DVD. More specifically, data 2, which are generally composed of 8 bits, are converted into modulated bit patterns, which are generally compose of 16 bits.

Modulation is achieved by a standard eight-to-sixteen modulator 4. Unlike the EFM system for CDs, the resulting 16 bits, which are ultimately cut into the DVD's surface, have two (instead of 1) values of output 6 that input to a standard demodulating device 8. Demodulating device 8 selects one output value, for example $O_{1a}$, depending on the sequence of each 8 bit pattern.

However, lookup table 10, attached to demodulating device 8, intentionally interferes with or alters the output value selection process performed by demodulating device 8 such that device 8 selects an otherwise incorrect output value $O_{1b}$ instead. This value is then recorded in the signal surface of the DVD by the standard constant linear velocity system, during the manufacturing process, as at 12. All of this occurs on the recording side of the pulse code modulation (PCM) system or similar recording system.

Subsequently, a master disc is prepared. The signal surface of a DVD is formed by the master disc with the patterns of microscopic bumps, called pits, of predetermined width and/or height. The pattern of pits and lands (non-pitted, flat surfaces) are determined in accordance with the value of each 16 channel bit pattern. Hence, the master disc is prepared in such a way that, during its rotation by a disc motor, the master disc is formed with pits followed by lands on tracks to be formed by a laser.

These pit and land patterns are subsequently transferred from the prepared master disc onto the signal surface of a DVD 14. Further, a light reflection film, such as aluminum, is deposited by vacuum evaporation onto the whole surface of the disc, including the pits, and a protective transparent layer is formed thereon. The reflection of light that strikes the pits and lands contained on the DVD's surface, are different. Owing to the changes of these light reflectances, the eight-to-sixteen modulation channel bits are reproduced to read the data during playback of the DVD.

However, as described below, any modulation technique may be used with the look-up table or similar rules-bases system, as well as with other embodiments of the invention described herein. For example, the eight-to-fourteen modulation technique, generally applicable for CDs, is equally compatible with the lookup table of the present invention.

By way of example, in the EFM system, each 8-bit data is converted into EFM bit patterns, generally composed of 14 bits. To this 14 bit patterns are added, for example, 3 merging symbols, or other number of merging symbols, in order to form a 17-channel bit, which is recorded as one symbol sequence on a CD.

All of the above process occurs on the recording side of the pulse code modulation (PCM) system. There are certain rules in the PCM system by which the 3 merging symbols are generally formed, for subsequent addition to the 14 EFM bit patterns, as at 8.

It is at this juncture that intentional breaking or modification of the rules occur, via lookup table 10. For a CD, which has a singular output value (instead of the 2 output values DVD requires), breaking is accomplished by configuring the value of the 3 merging bits to be '312' where it should read '123', for example. The lookup table 10 intentionally breaks the rules by which the 3, or other number of, merging bits are formed, and each broken rule value is cut into the disc at recording.

Thus, look-up table 26 is basically a table of values that is stored on a data media memory device, such as a CD ROM, and retrievable by standard predetermined logic or algorithms. Look-up table 26 translates data that has been obtained or read from a disc into an otherwise incorrect or modified final stream of zeros and ones whose combination will serve as an authentication key or keys, or portion(s) of key(s). Also, the 8 bits, or other number of bits, of data entering look-up table 26 may alternatively comprise data from the error correction component of the signal from the disc, such as the audio, corrected audio, or corrected video for a DVD.

Figure 11:
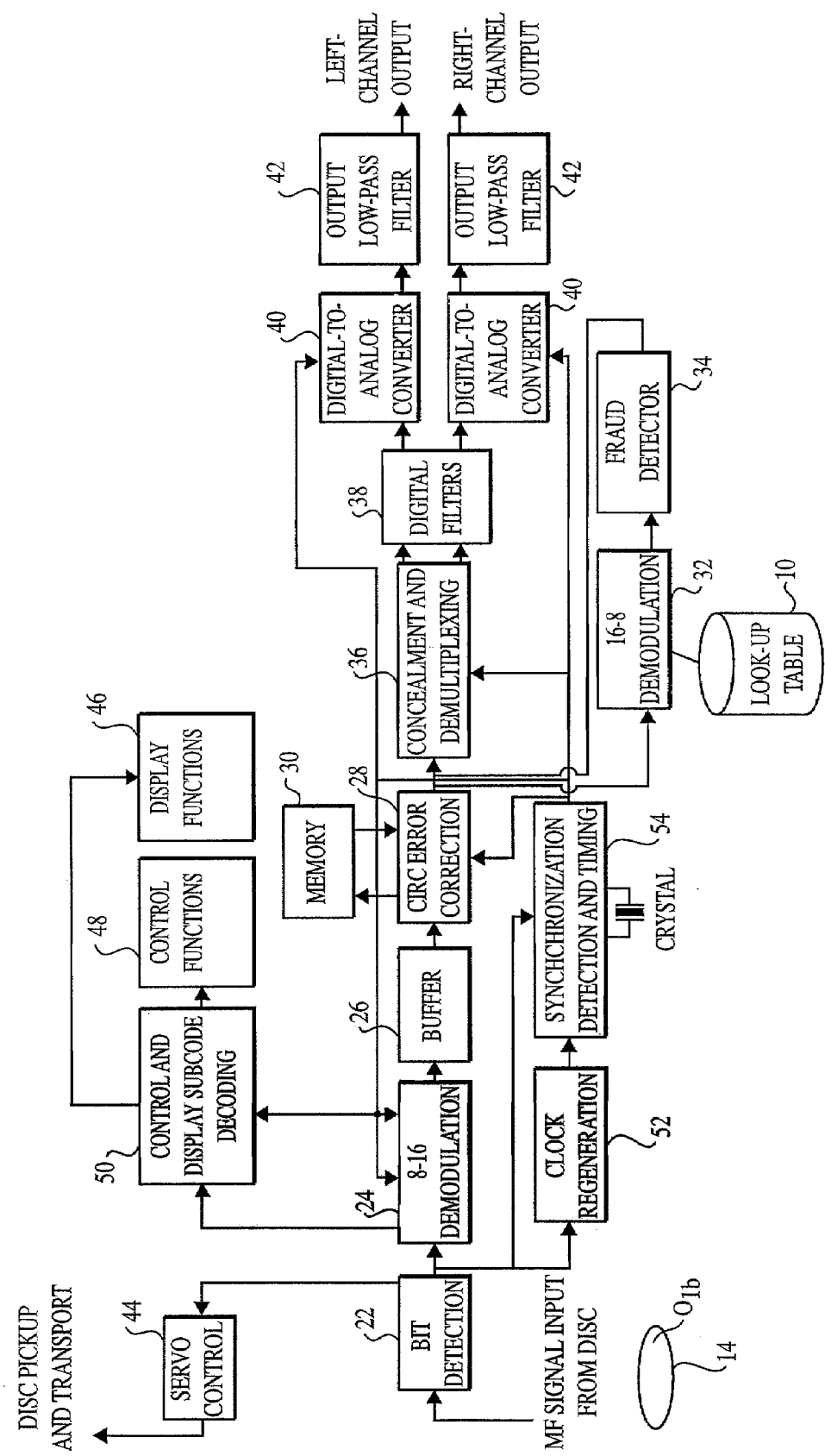
FIG. 11 shows a block diagram of a CD player of the present invention, which includes a lookup table, demodulator unit and a fraud detector.

FIG. 11 shows a schematic of a modified disc player, such as a DVD player, of the present invention, which includes a demodulation device, fraud detector and a lookup table. Upon playback, the disc player begins reading DVD 14 by detecting bits from the disc's surface, as at 22. Once data is recovered from disc 14, it must be demodulated, as at 31; that is, the DVD player must go through a series of activities to decode audio information in order to reconstruct an audio signal.

The other elements of the audio data path whose interaction ultimately produces a stereo analog signal include buffer 26, an error correction circuit, as at 28, de-interleaving RAM 30, a standard 16 to 8 demodulator 32 and connecting lookup table 10, a fraud detector 34, which contains an authentication module, concealment and demultiplexing circuit 36, and digital filters 38. The process of converting digital data to a stereo analog signal requires one or two digital-to-analog converters 40 and low-pass filters 42.

The servo control system 44 along with a display system, as at 46, work together in controlling mechanical operation of the DVD player. These operations include the player's spindle drive as well as auto-tracking and auto-focusing functions. Both systems 44, 46 also directs the user interface to the DVD player's controls 48 and displays.

A standard microprocessor or other data processor (not shown) monitors user controls and their interface to the player's circuitry, which includes subcode data decoding, as at 50. Subcode data plays important role in directing the pickup to the proper disc location. Moreover, the various elements of the DVD player shown in FIG. 11 are closely interrelated in a timing relationship, as at 50, 52, that determines correct rotating speed and data output rate, for example.

All of the above components illustrated in FIG. 11 generally comprise standard components in DVD players, with the exception of the modified lookup table 10 and fraud detector 34. Lookup table 10, like fraud detector 34, comprises a separate data processor, such as a standard processor, that performs the functions described herein. Alternatively, lookup table 10 and fraud detector 34 may advantageously be implemented on the existing processing hardware currently existing in DVD players.

Look-up table 10, as an authentication mechanism, may be used with other authentication techniques described herein, to obtain, for example, a double or triple security authentication system using two or three different keys, or gathering these keys.

In accordance with the present invention of using a look-up table 10 for modulating data input to a DVD or CD, the modulated data is lost on the digital output, and therefore difficult to pirate. This is in contrast to the direct EFM output, which is designed to include modulated information in the audio, as described in U.S. Pat. No. 5,319,735, incorporated herein by reference.

As previously mentioned, the EFM modulation system is often referred to in this manner, because it contains the 8-14 modulation on a CD. In general, conventional EFM systems will transfer intentional errors during a normal output. So, the basis of the EFM system for generating an authentication key or component of a key, is that no error correction is performed on the digital signal. On the other hand, the basis of the physical keys is that error correction is performed on the digital signal.

Again, the modified lookup table could be used in combination or individually to derive part, or one, of the authentication key(s). This technique of intentionally interfering with conventional modulation rules could also be used to gate or compile one of the other keys on a disc, such that the lookup table may be used to generate separate keys, or part of one key, or pick out a key from the whole stream of data.

An advantage of the look-up table is that it provides extra insulation against spurious activities of a potential hacker.

Figure 12:
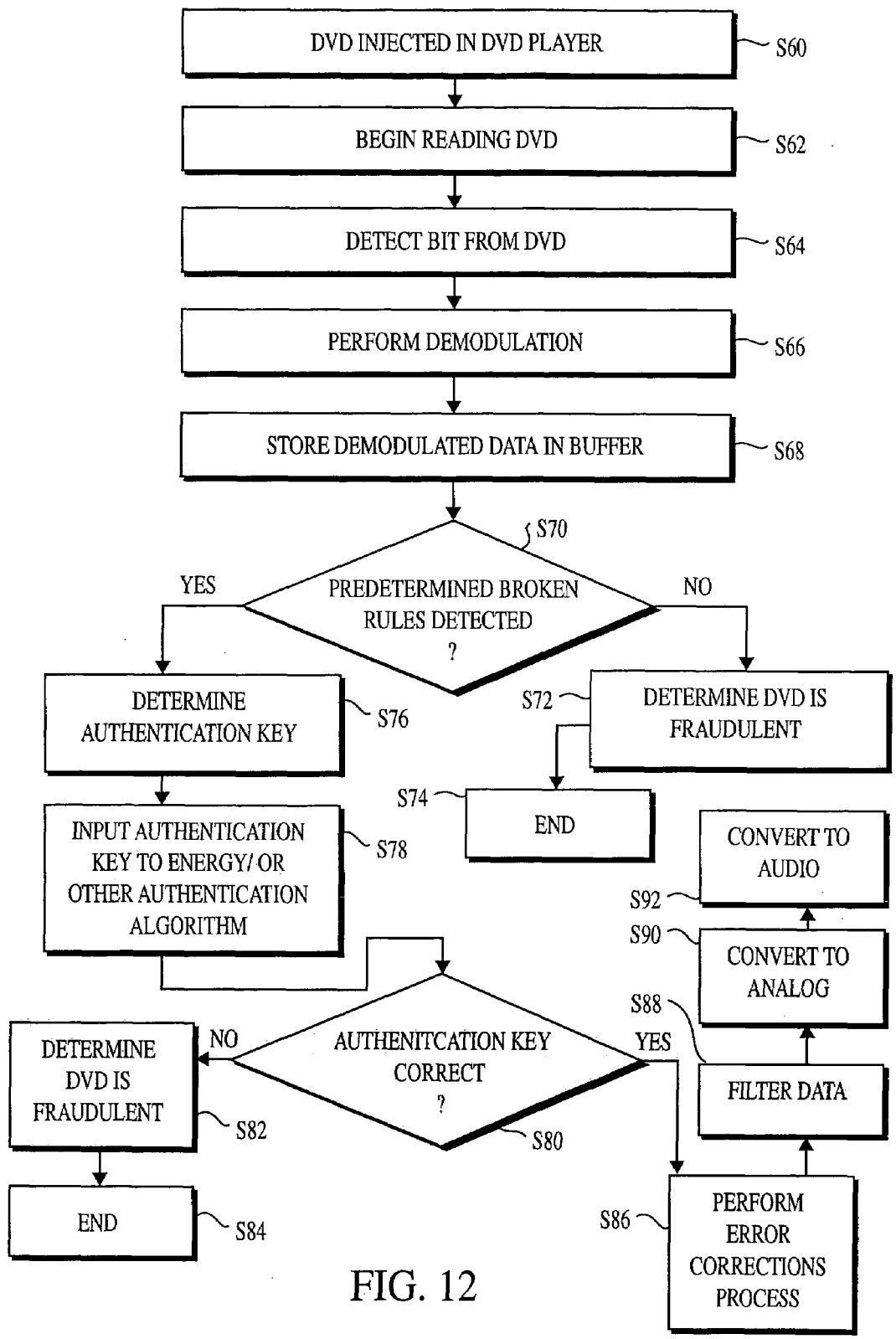
FIG. 12 shows a flow chart of a the decision logic describing the authentication process of a CD to be played on a CD player.

FIG. 12 illustrates a flow chart of the decision logic describing operation of a disc player when attempting to play a CD in accordance with one embodiment of the invention. For simplicity, the following steps are identified in the drawings by the letter "S" preceding the reference numeral; that is, Step 60 is shown in the drawings as "S60", etc.

The process begins at S60 (Step 60) when a DVD is inserted into a DVD player. The player begins reading the DVD (Step 62) by detecting bits from the disc's surface (Step 64). Once the data is recovered, the data is demodulated using, for example, eight-to-sixteen modulation (Step 66). The demodulated data is sent to a buffer (Step 68).

At Step 70, the DVD player's circuitry or processes must determine whether the data on the DVD contains the intentionally broken or modified modulation rule values. If not, the disc is determined to be fraudulent (Step 72), and the player ends playback activity (Step 74). On the other hand, if it is found that the DVD contains predetermined broken or modified rule values, the next Step 76 is to read those values and determine authentication key(s), and an optical operation performed by a standard decryption algorithm located within the fraud detector's authentication module decrypts the authentication key.

Once the authentication key(s), based on the modified rules, is/are read into the authentication or comparison algorithm (Step 78), it is then determined whether the derived authentication key(s) is/are correct (Step 80). The authentication algorithm in the DVD player will have a component or components or keys corresponding to the authentication key(s), for example, stored on the DVD. If comparison of the component with the key(s) does not substantially match using optional standard matching algorithms, the DVD is determined to be fraudulent (Step 82), and playback activity ends (Step 84).

If, on the other hand, it is determined that the derived component or keys correctly matches each authentication key, the player's circuitry is triggered to begin the error removal process (Step 86) in which errors and each predetermined authentication key are removed, data is filtered (Step 88) and ultimately converted to sensible audible output data (Steps 90, 92). While the above description focuses on a particular sequence of process steps, the present invention may alternatively be used via a different sequence of the above described steps.

Figure 13:
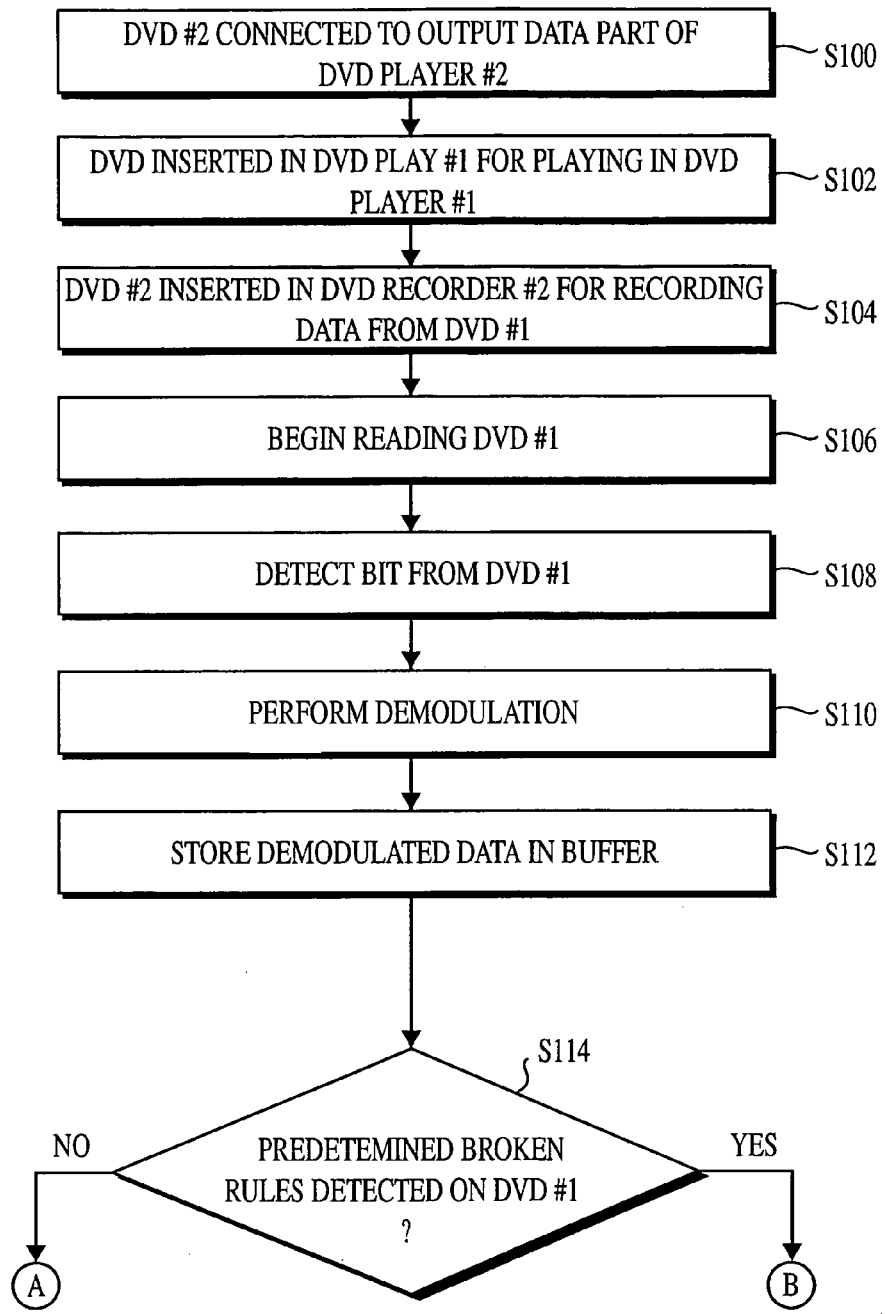
FIGS. 13-16 show a flow chart of the decision logic describing the authentication process of a CD to be copied by a CD recorder.

FIG. 13 illustrates a flow chart of the decision logic describing operations when a first CD plays the data to be recorded by a second CD. For simplicity, the DVD player will be referenced as player #1, and the DVD recorder will be referenced as recorder #2. Also, the first DVD played by player #1 will be referenced as DVD #1, and the second DVD recorded by recorder #2 will be referenced as DVD #2.

At inception, (Step 100), DVD player #1 is connected to the output port of recorder #2, or other standard means for capturing the output of player #1. Playback begins when DVD #1 is inserted into player #1 (Step 102). Recording begins when DVD #2 is inserted into recorder #2 (Step 104). The next step in DVD player #1 is the reading of DVD #1 (Step 106), by detecting bits contained on the surface of DVD #1 (Step 108).

Once the data is recovered, the data is demodulated using, for example, eight-to-sixteen modulation or other standard modulation (Step 110). The demodulated data is transferred and stored in a buffer (Step 112).

Figure 14:
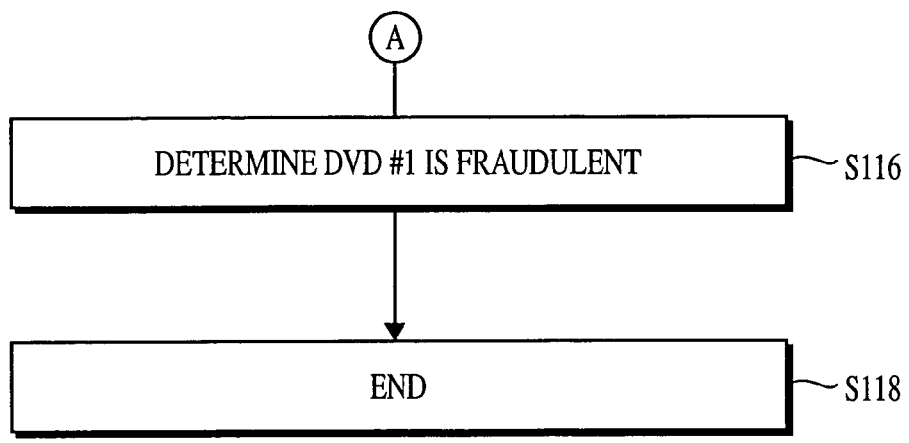

At Step 114 (S114) depicted in FIG. 13, the player's circuitry must determine whether the data on DVD #1 contains the broken or modified rule value(s) produced by the lookup table. If not, the disc is determined to be fraudulent (Step 116), and player #1 ends playback activity (Step 118). See FIG. 14.

Figure 15:
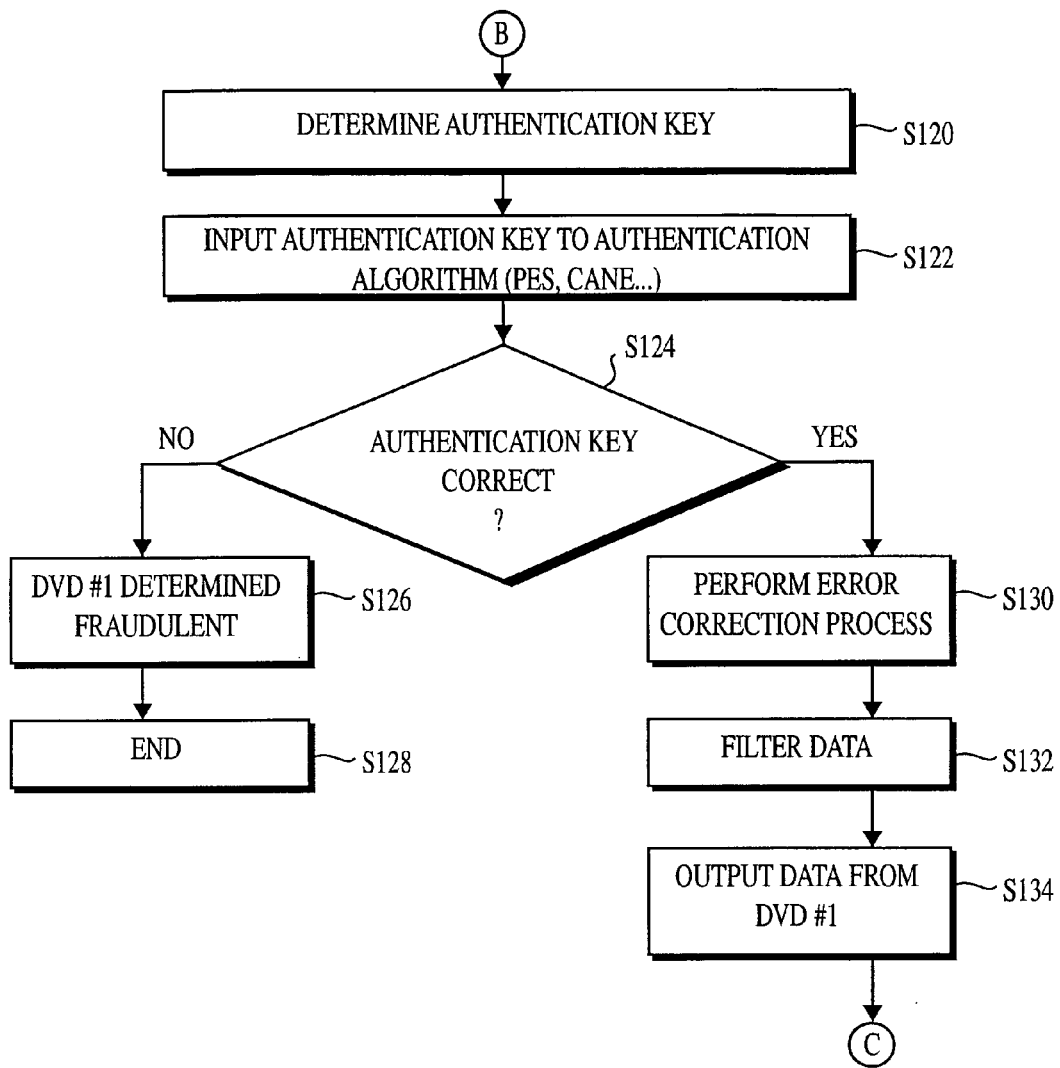

On the other hand, if it is found that DVD #1 contains the broken or modified rule value(s), the next step S120 in FIG. 15 is to read each value and determine or derive authentication key(s). Any standard decryption algorithm may optionally be used to further decrypt the derived authentication key, such as the standard data encryption standard (DES) and the like, located within the authentication module of DVD player #1. See FIG. 15.

Once each authentication key is read into a standard authentication or comparison algorithm (Step 122) in a standard manner, it is then determined whether each, or combination of, authentication key(s) is correct (Step 124). The authentication algorithm in DVD player #1 will have or compare a component or key stored thereon with the authentication key(s) on or derived from DVD #1. If comparison of the key(s) does not result in a substantial match, DVD #1 is determined to be fraudulent (Step 126), and playback activity ends (Step 128).

If, on the other hand, it is determined in Step 124 that the keys substantially match each other, the player's circuitry is triggered to begin the error removal process (Step 130), in which errors and authentication key(s) are removed, and the data is filtered (Step 132) and ultimately converted to sensible audible output data (Step 134).

Figure 16:
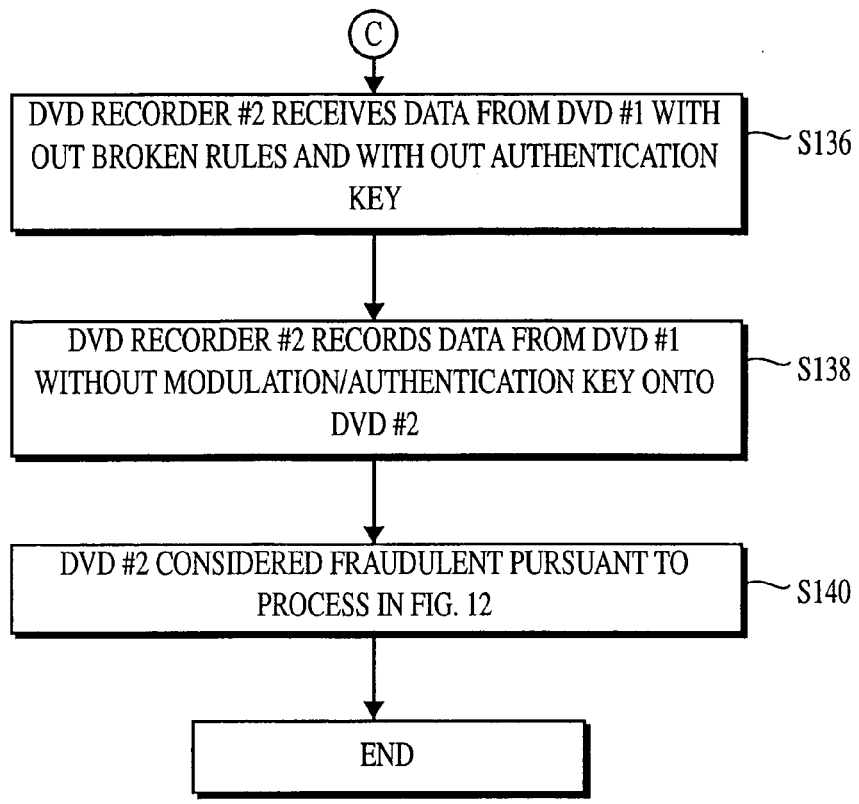

Referring to FIG. 16, at this juncture, the authentication process for playing the DVD is completed, and recorder #2 receives the audio data from DVD #1 (Step 136). This data is free of broken or modified rule values and authentication key(s). Upon receipt, DVD recorder #2 records the data onto DVD #2, a copy (Step 138). If DVD #2 is later inserted into a DVD player of the present invention, (e.g., a DVD player equipped with a lookup table and fraud detector), it will be determined to be a fraudulent DVD pursuant to the above-mentioned process of FIG. 12, because DVD #2 does not contain the requisite predetermined broken or modified rule values for authentication since these values were not transferred in the data, such as the audio data (Step 140).

Figure 17:
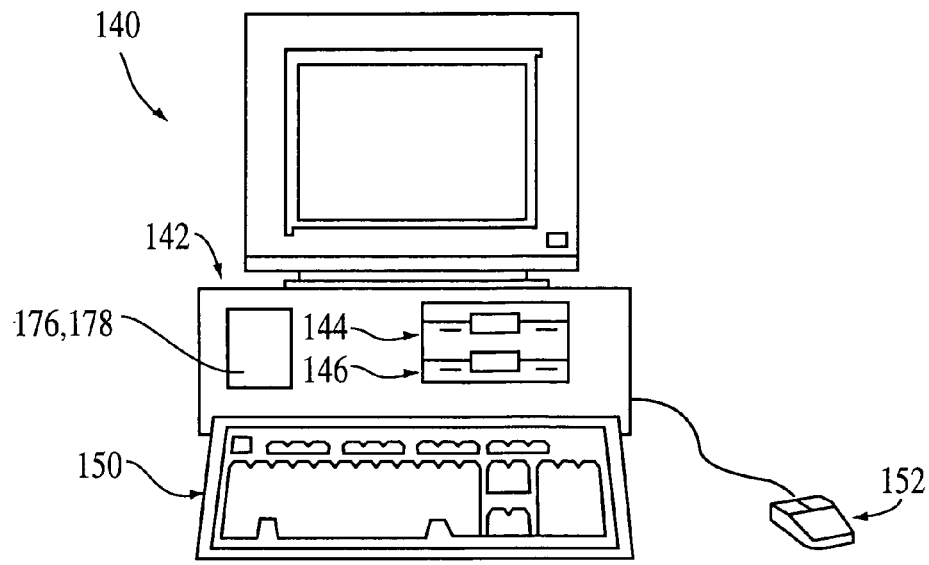
FIG. 17 is an illustration of a main central processing unit for implementing the computer processing in accordance with a computer implemented embodiment of the present invention when the data player and/or recorder is part of a personal computing system.

FIG. 17 is an illustration of a main central processing unit for implementing the computer processing in accordance with a computer implemented embodiment of the present invention, when the data player and/or recorder is part of a personal computing system. The procedures described above may be presented in terms of program procedures executed on, for example, a computer or network of computers.

Viewed externally in FIG. 17, a computer system designated by reference numeral 140 has a central processing unit 142 having disc drives 144 and 146. Disc drive indications 144, 146 are merely symbolic of a number of disc drives that might be accommodated by the computer system. Typically these would include a floppy disc drive such as 144, a hard disc drive (not shown externally) and a CD ROM indicated by slot 146. The number and type of drives varies, typically with different computer configurations. Disc drives 144, 146 are in fact optional, and for space considerations, may be easily omitted from the computer system used in conjunction with the production process/apparatus described herein.

The computer also has an optional display 148 upon which information is displayed. In some situations, a keyboard 150 and a mouse 152 may be provided as input devices to interface with the central processing unit 142. Then again, for enhanced portability, the keyboard 150 may be either a limited function keyboard or omitted in its entirety. In addition, mouse 152 may be a touch pad control device, or a track ball device, or even omitted in its entirety as well. In addition, the computer system also optionally includes at least one infrared transmitter 176 and/or infrared receiver 178 for either transmitting and/or receiving infrared signals, as described below.

Figure 18:
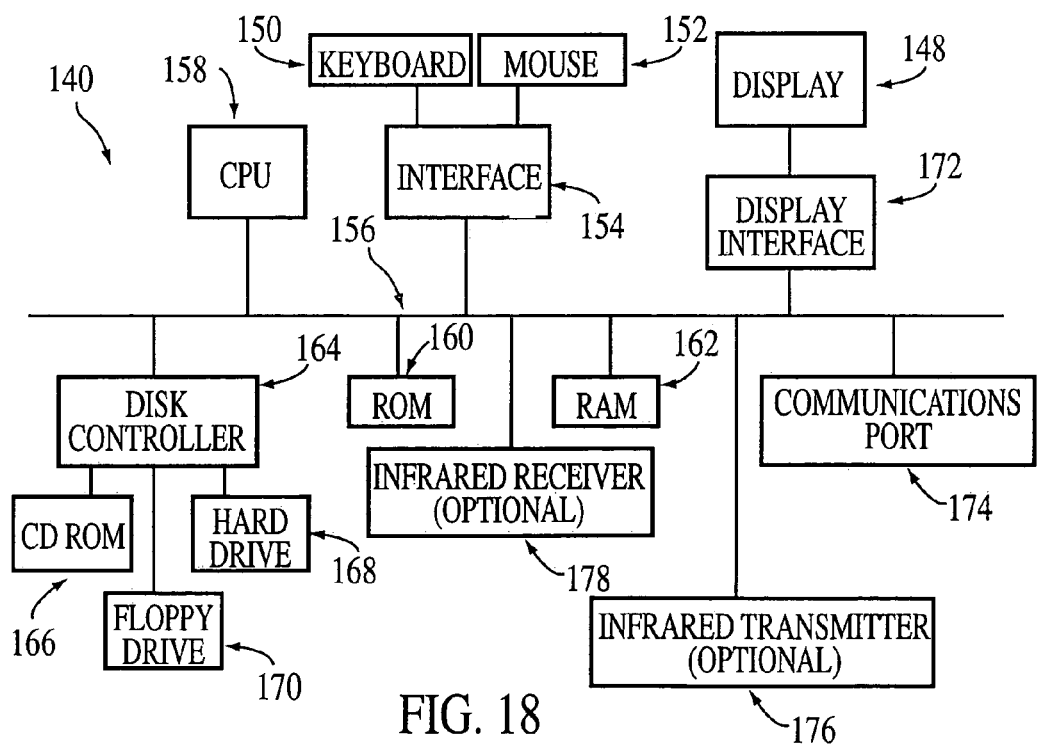
FIG. 18 illustrates a block diagram of the internal hardware of the computer of FIG. 17.

FIG. 18 illustrates a block diagram of the internal hardware of the computer of FIG. 17. A bus 156 serves as the main information highway inter-connecting the other components of the computer. CPU 158 is the central processing unit of the system, performing calculations and logic operations required to execute a program. Read only memory (ROM) 160 and random access memory (RAM) 162 constitute the main memory of the computer. Disc controller 164 interfaces one or more disc drives to the system bus 156. These disc drives may be floppy disc drives such as 170, or CD ROM or DVD (digital video disc) drives such as 166, or internal or external hard drives 168. As indicated previously, these various disc drives and disc controllers are optional devices.

A display interface 172 interfaces display 148 and permits information from the bus 156 to be displayed on the display 148. Again as indicated, display 148 is also an optional accessory. For example, display 148 could be substituted or omitted. Communication with external devices, for example, the components of the apparatus described herein, occurs using communications port 174. For example, optical fibers and/or electrical cables and/or conductors and/or optical communication (e.g., infrared and the like) and/or wireless communication (e.g., radio frequency (RF) and the like) can be used as the transport medium between the external devices and communication port 174.

In addition to the standard components of the computer the computer also optionally includes at least one of infrared transmitter 176 or infrared receiver 178. Infrared transmitter 176 is used when the computer system is used in conjunction with one or more of the processing components/stations that transmits/receives data via infrared signal transmission.

Figure 19:
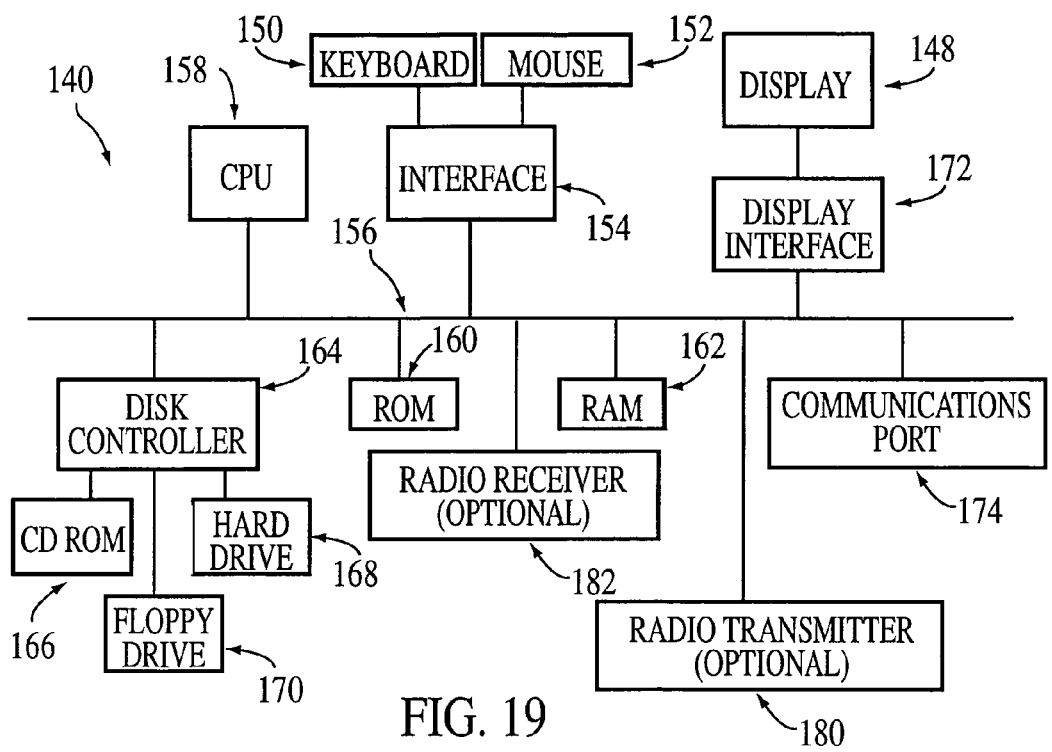
FIG. 19 is a block diagram of the internal hardware of the computer of FIG. 17 in accordance with a second embodiment.

FIG. 19 is a block diagram of the internal hardware of the computer of FIG. 17 in accordance with a second embodiment. In FIG. 19, instead of utilizing an infrared transmitter or infrared receiver, the computer system uses at least one of a low power radio transmitter 180 and/or a low power radio receiver 182. The low power radio transmitter 180 transmits the signal for reception by components of the production process, and receives signals from the components via the low power radio receiver 182. The lower power radio transmitter and/or receiver 180, 182 are standard devices in industry.

Figure 20:
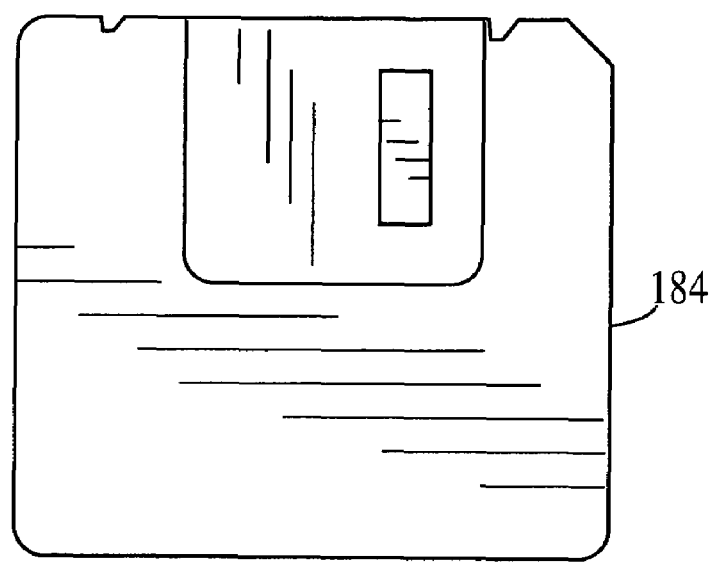
FIG. 20 is an illustration of an exemplary memory medium that can be used with disc drives illustrated in FIGS. 17-19.

FIG. 20 is an illustration of an exemplary memory medium which can be used with disc drives illustrated in FIGS. 17-19. Typically, memory media such as floppy discs, or a CD ROM, or a digital video disc will contain, for example, a multi-byte locale for a single byte language and the program information for controlling the computer to enable the computer to perform the functions described herein. Alternatively, ROM 160 and/or RAM 162 illustrated in FIGS. 18-19 can also be used to store the program information that is used to instruct the central processing unit 158 to perform the operations associated with the production process.

Although processing system 140 is illustrated having a single processor, a single hard disc drive and a single local memory, processing system 140 may suitably be equipped with any multitude or combination of processors or storage devices. Processing system 140 may, in point of fact, be replaced by, or combined with, any suitable processing system operative in accordance with the principles of the present invention, including sophisticated calculators (and handheld), laptop/notebook, mini, mainframe and super computers, as well as processing system network combinations of the same.

Conventional processing system architecture is more fully discussed in *Computer Organization and Architecture*, by Williams Stallings, McMillan Publishing Co. (3rd ed. 1993); conventional processing system network design is more fully discussed in *Data Network Design*, by Darren L. Spohn, McGraw-Hill, Inc. (1993), and conventional data communications is more fully discussed in *Data Communications Principles*, by R. D. Gitlin, J. F. Hayes and S. B. Weinstein, Plenum Press (1992) and *The Irwin Handbook of Telecommunications*, by James Harry Green, Irwin Professional Publishing (2nd ed. 1992). Each of the foregoing publications is incorporated herein by reference.

Alternatively, the hardware configuration may be arranged according to the multiple instruction multiple data (MIMD) multiprocessor format for additional computing efficiency. The details of this form of computer architecture are disclosed in greater detail in, for example, U.S. Pat. No. 5,163,131; Boxer, A., "Where Buses Cannot Go", IEEE SPECTRUM, February 1995, pp. 41-45; and Barroso, L. A. et al., "RPM: A Rapid Prototyping Engine for Multiprocessor Systems", IEEE COMPUTER, February 1995, pp. 26-34, all of which are incorporated herein by reference.

In alternate preferred embodiments, the above-identified processor, and in particular microprocessing circuit 158, may be replaced by or combined with any other suitable processing circuits, including programmable logic devices, such as PALs (programmable array logic) and PLAs (programmable logic arrays), DSPs (digital signal processors), FPGAs (field programmable gate arrays), ASICs (application specific integrated circuits), VLSIs (very large scale integrated circuits) or the like.

Figure 21:
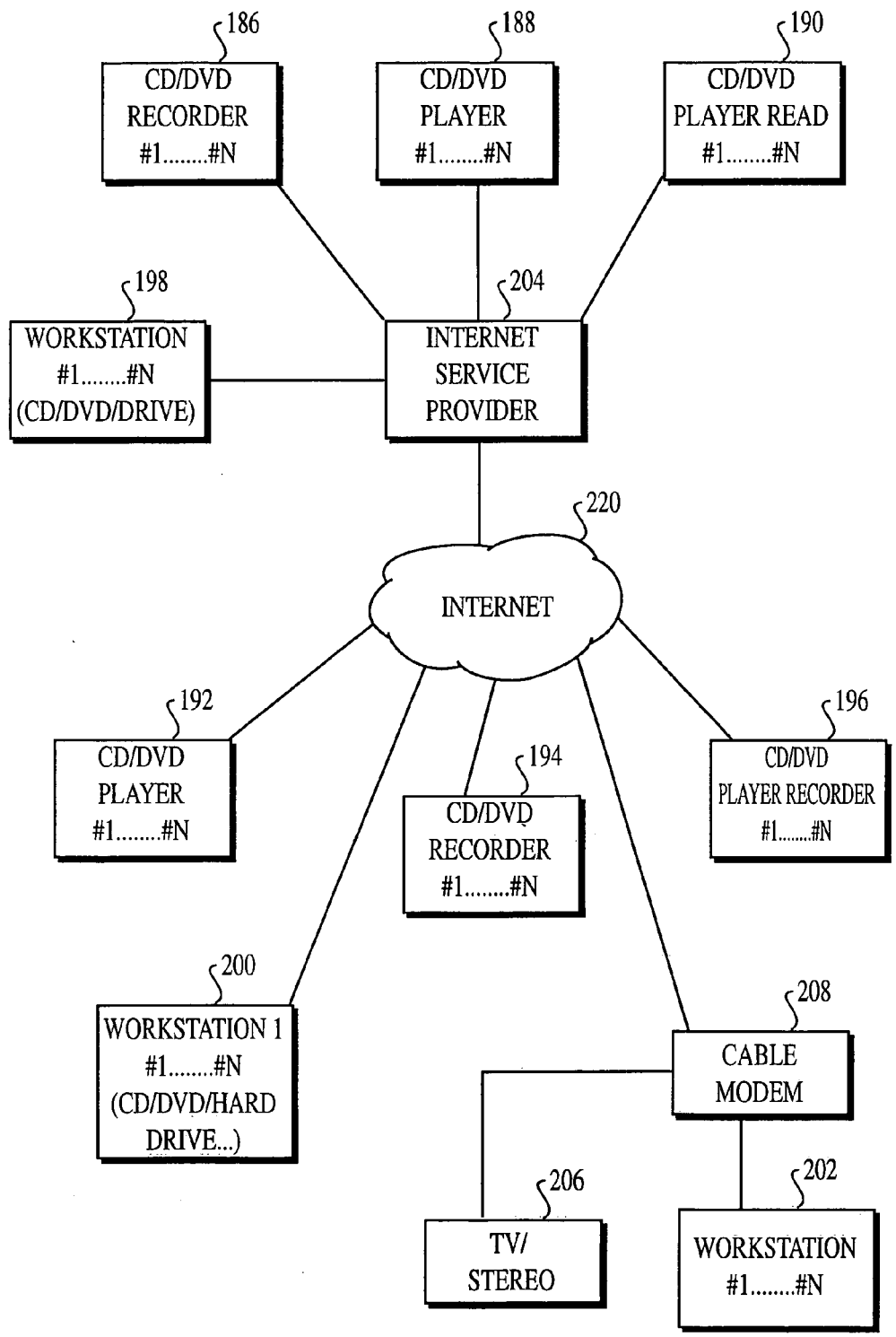
FIG. 21 shows a plurality of disc players, disc recorders and work stations connected to a global network, such as an Internet.

FIG. 21 shows a plurality of disc players and disc recorders 186, 188, 190, 192, 194, 196 and work stations 198, 200, 202 connected to a global network, such as the Internet 220, via an Internet Service Provider 204, in accordance with one embodiment. The above system also accommodates Internet access to electronic audio/video data files through home electronic equipment, such as television/stereos 206 and cable/modem 208. Thus, data may emanate from, or be transmitted to, any one of these stations or devices.

Figure 22:
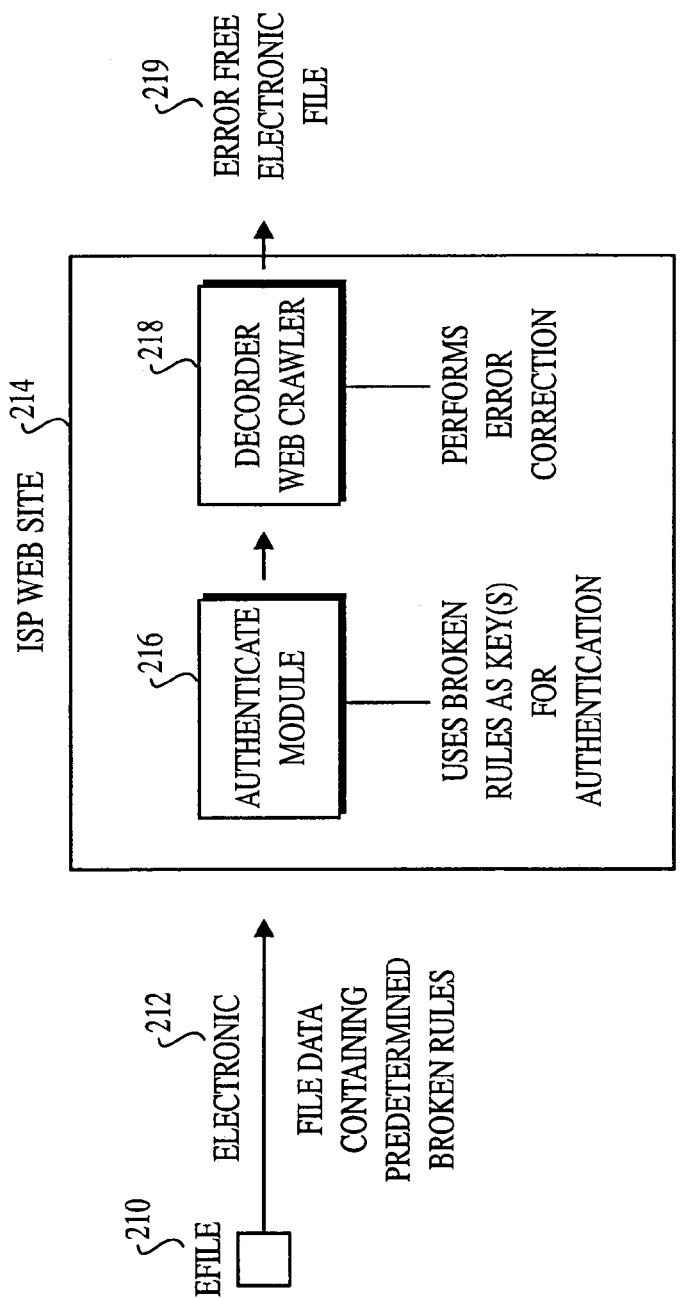
FIG. 22 shows a block diagram of the process by which broken modulation rules are intentionally embedded into an electronic audio/video file, and are used as a key or keys for authenticating the efile.
Figure 23:
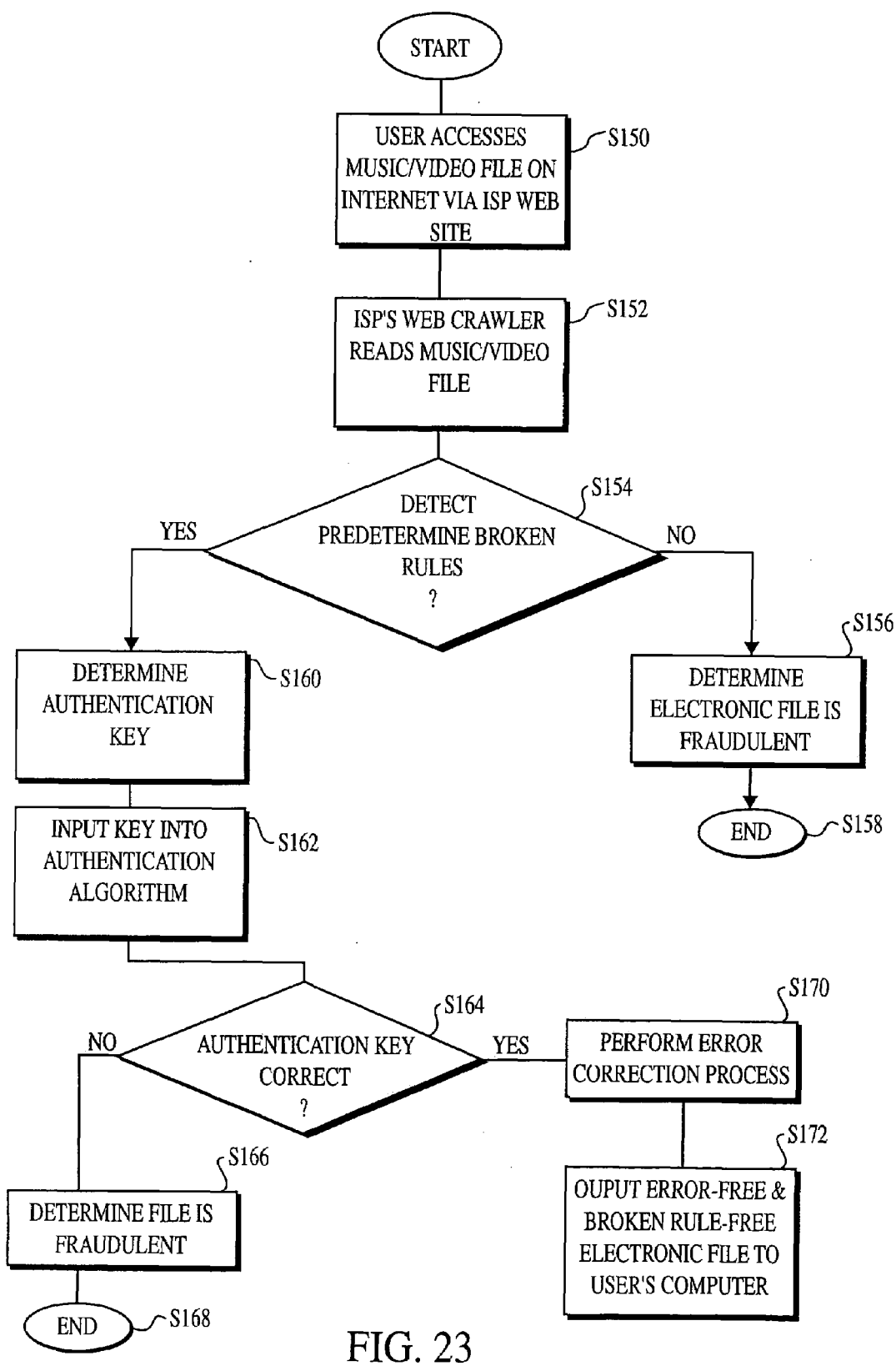
FIG. 23 shows a flow chart of the decision logic describing the authentication process of an electronic audio/video data file retrieved via the Internet for playing.

FIGS. 22-23 shows the authentication process as it applies to Internet-related playing and copying. For instance, FIG. 22 shows a block diagram of the process by predetermined broken rule values, produced from the lookup table, are stored in an electronic file, and are used as an authentication key or keys for authenticating the existence of a non-pirated efile. The process begins with a data media, which may be a disc, a computer or network of computers, such as the Internet, capable of storing data.

In this embodiment, the data is an electronic video or audio data file ("efile") 210 into which broken rule values are reproduced. These values are mixed and edited with the original video or audio data and stored in the efile.

The resulting data ("efile data") 212 containing each broken or modified rule value is transmitted into an authentication module 216 when efile 210 is requested by a user over the Internet. Authentication module 216 is disposed, for example, at the ISP's web site 214, which uses each broken rule value in efile data 212 as a key or keys or components thereof, for authenticating whether efile 210 is a non-pirated file. Once efile 210 is authenticated, authentication module 216 transfers data 212 to a decoder web crawler 218, which intakes the data, manipulates it, performs error correction and outputs corrected data 219. The new corrected data 219 is free of all broken or modified rule values and authentication keys, and contains the original (audio and/or video) data only.

The above description is one example of the architecture used to implement the present invention, and other architectures may also be used. For example, the ISP website and/or server need not physically house or contain the authentication or decoder modules, but one or both of these devices may be disposed remote to the ISP website and/or server.

FIG. 23 illustrates a flow chart of the decision logic describing the authentication process of an electronic audio/video data file retrieved via the Internet for playing. The process begins at Step 150 (S156) when a user accesses music and/or video file(s) on the Internet via an ISP's web site 214. The ISP's decoder web crawler 218 begins reading the efile 210, (Step 152), looking for broken or modified rule value(s)

produced by the lookup table (Step 154). If no modulated data is found, efile 210 is determined to be fraudulent, (Step 156), and efile 210 is not transmitted to the user (Step 158). Thus, unauthorized access is prevented.

On the other hand, if it is found that efile 210 contains at least one broken rule output value, the next Step 160 is to read those values and determine the authentication key(s), an operation performed by an authentication algorithm located within authentication module 216.

Once the authentication key(s) or components thereof is/are read into the authentication algorithm and optionally decrypted, (Step 162), it is then determined whether the authentication key(s) is/are correct (Step 164). The authentication algorithm at the ISP's web site 214 will have a component corresponding to the authentication key(s) in efile 210. If comparison of the component with the key(s) does not match, efile 210 is determined to be fraudulent (Step 166), and efile 210 is not transmitted to the user (Step 168).

If, on the other hand, it is determined that the component correctly or substantially matches the authentication key(s), error correction occurs, (Step 170), the broken rule value is filtered out, the data is converted to sensible audio and/or video output data, and ultimately transmitted to the user (Step 172).

Figure 24:
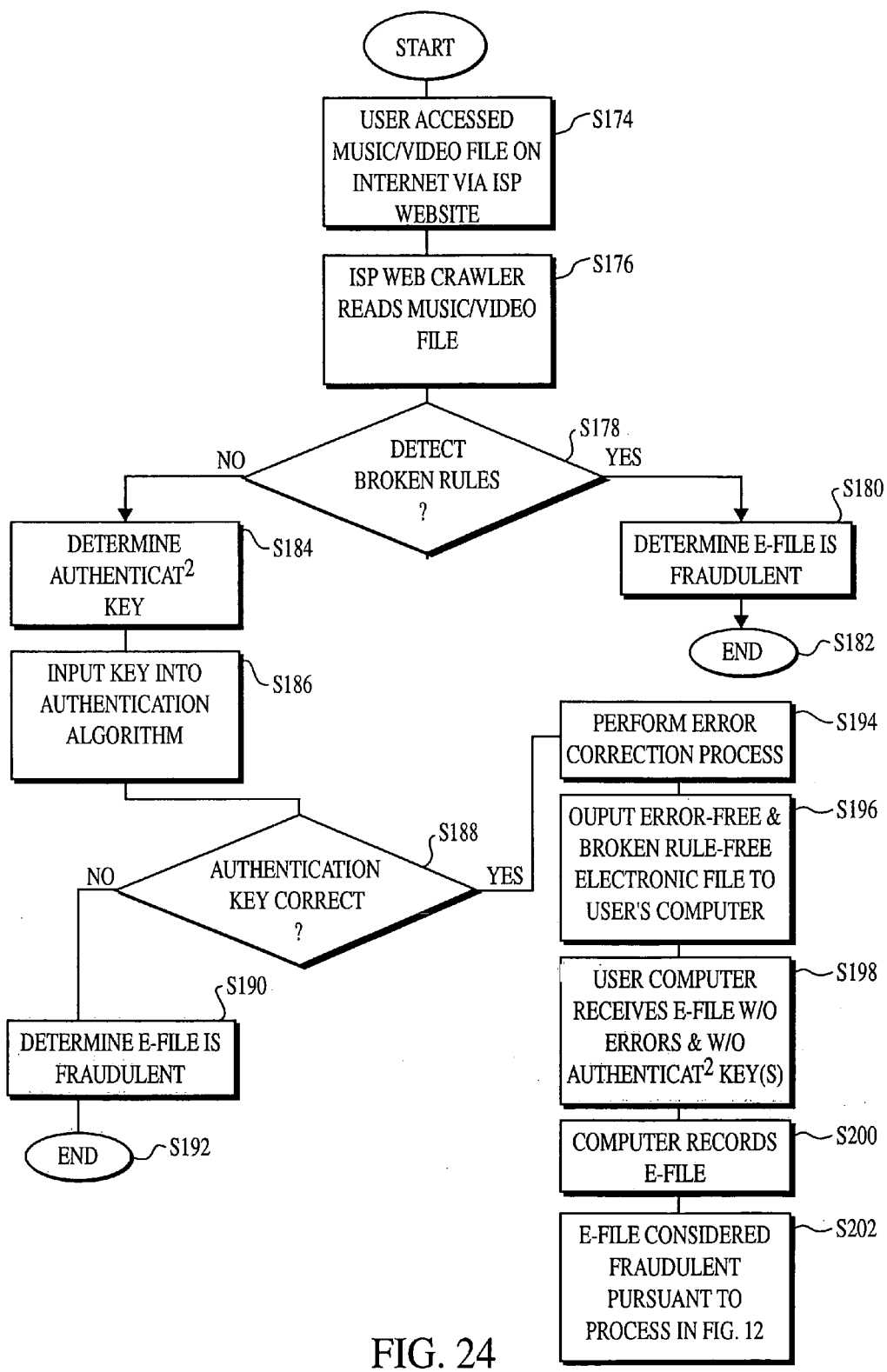
FIG. 24 shows a flow chart of the decision logic describing the authentication process of an electronic audio/video data file retrieved via the Internet for copying.

FIG. 24 illustrates a flow chart of the decision logic describing the authentication process of an electronic audio/video data file retrieved via the Internet for copying. The process begins at Step 174 (S174) when a user accesses music and/or file(s) on the Internet via an ISP's web site 214. The ISP's decoder web crawler 218 reads the efile 210 (Step 176) looking for each broken rule value (Step 178). If no values are found, efile 210 is determined to be fraudulent (Step 180), and efile 210 is not transmitted to the user (Step 182). Thus, unauthorized access is prevented.

On the other hand, if it is found that efile 210 contains at least one broken or modified rule value, the next Step 184 (S184) is to read that the value(s) and determine the authentication key(s), an operation performed by an authentication algorithm located within authentication module 216.

Once the authentication key or keys are read into the authentication algorithm (Step 186) and optionally decrypted, it is then determined whether each authentication key is correct (Step 188). The authentication algorithm at the ISP's web site 214 will have a component corresponding to the authentication key(s) in efile 210. If comparison of the derived component or keys with the key(s) or components thereof does not match or substantially match, efile 210 is determined to be fraudulent (Step 190), and efile 210 is not transmitted to the user (Step 192).

If, on the other hand, it is determined that the derived component or keys correctly matches the authentication key(s), error correction occurs (Step 194), errors are removed, broken rule values are filtered out, and the data is converted to sensible audio and/or video output data, and ultimately transmitted to the user (Step 196). The user's computer receives an efile 210 free of errors, modified or broken rule values and, therefore, authentication key(s) (Step 198), at which point a user may record the efile 120 (Step 200). This efile 210 is considered fraudulent for purposes of future Internet use (S202), pursuant to the process outlined in FIG. 12, because it does not contain the requisite modified or broken rule values/authentication keys, or component(s) thereof for subsequent authentication.

Figure 25:
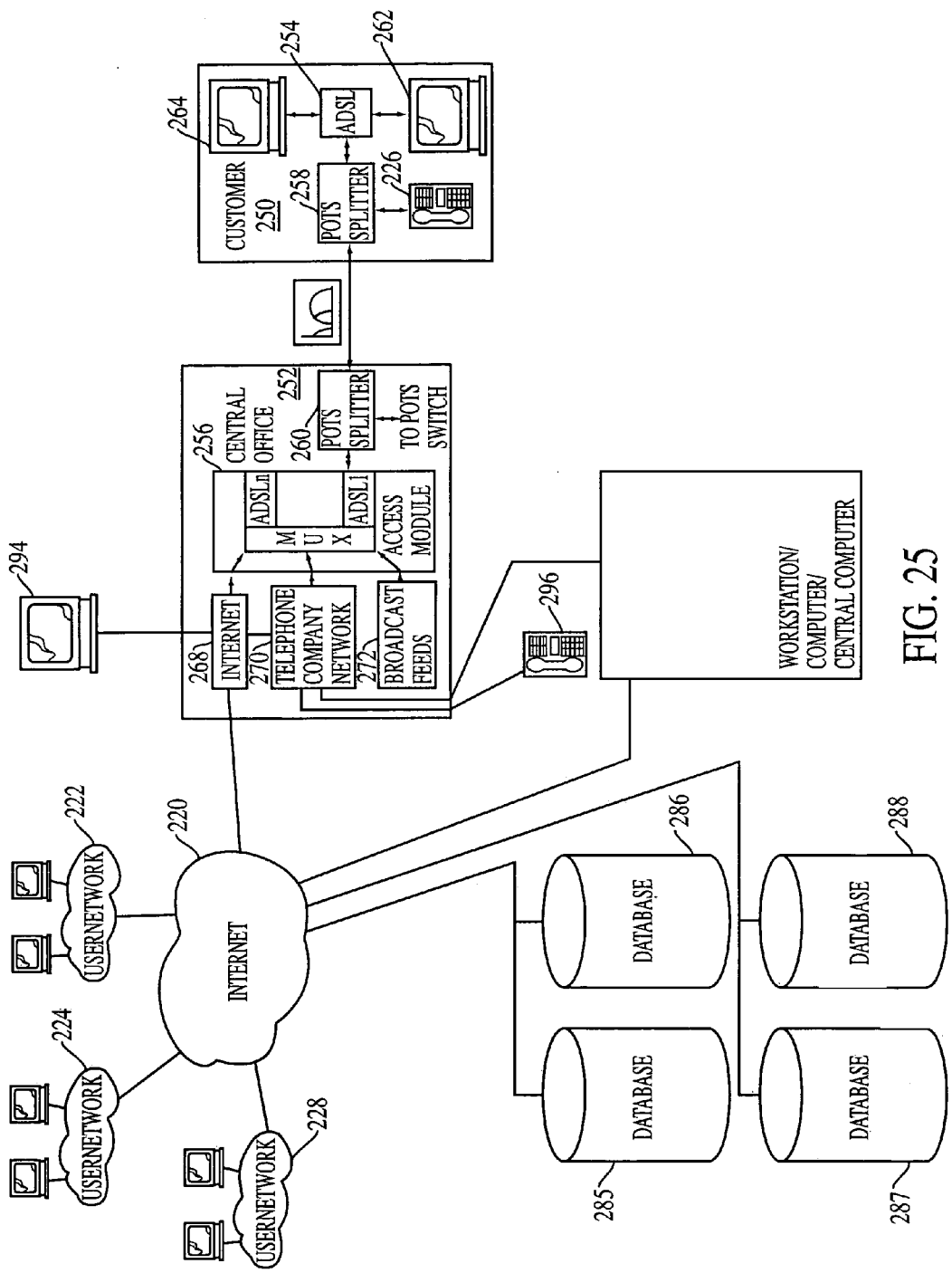
FIG. 25 is an illustration of the architecture of the combined Internet, POTS and ADSL architecture for use in the present invention in accordance with another design or embodiment.

FIG. 25 is an illustration of the architecture of the combined Internet, POTS, and ADSL architecture for use in the present invention in accordance with another embodiment. In FIG. 25, to preserve POTS and to prevent a fault in the ADSL equipment 254, 256 from compromising analog voice traffic 226, 296 the voice part of the spectrum (the lowest 4 kHz) is optionally separated from the rest by a passive filter, called a POTS splitter 258, 260. The rest of the available bandwidth (from about 10 kHz to 1 MHZ) carries data at rates up to 6 bits per second for every hertz of bandwidth from data equipment 262, 264, 294. The ADSL equipment 256 then has access to a number of destinations including significantly the Internet 268, and other destinations 270, 272.

To exploit the higher frequencies, ADLS makes use of advanced modulation techniques, of which the best known is the discrete multitone technology (DST). As its name implies, ADSL transmits data asymmetrically—at different rates upstream toward the central office 252 and downstream toward the subscriber 250.

Cable television providers are providing analogous Internet service to PC users over their TV cable systems by means of special cable modems. Such modems are capable of transmitting up to 30 Mb/s over hybrid fiber/coax systems, which use fiber to bring signals to a neighborhood and coax to distribute it to individual subscribers.

Cable modems come in many forms. Most create a downstream data stream out of one of the 6-MHZ television channels that occupy spectrum above 50 MHZ (and more likely 550 MHz) and carve an upstream channel out of the 5-50 MHZ band, which is currently unused. Using 64-state quadrature amplitude modulation (64 QAM), a downstream channel can realistically transmit about 30 Mb/s (the oft-quoted lower speed of 10 Mb/s refers to PC rates associated with Ethernet connections). Upstream rates differ considerably from vendor to vendor, but good hybrid fiber/coax systems can deliver upstream speeds of a few megabits per second. Thus, like ADSL, cable modems transmit much more information downstream than upstream.

The Internet architecture 220 and ADSL architecture 254, 256 may also be combined with, for example, user networks 222, 224, 228. As illustrated in this embodiment, users may access or use or participate in the administration, or management computer assisted program in computer 240 via various different access methods. In this embodiment, the various databases 285, 286, 287 and/or 288, which may be used to store content, data and the like, are accessible via access to and/or by computer system 240, and/or via Internet/local area network 220.

The above embodiments are only to be construed as examples of the various different types of computer systems that may be utilized in connection with the computer-assisted and/or -implement process of the present invention. Further, while the above description has focused on 8-16 or 8-14 modulated data into a specific media, such as a CD, the present invention may also be used to introduce such modulated data to a digital bit stream that is in the process of being transmitted from an originating area or device to a destination device.

That is, the authentication process of the present invention may be used to authenticate a data stream or collection of data, as opposed to, or in addition to, authenticating a specific media that has been used to play the data. In addition, various standard matching algorithms may be used to determine whether the generated authentication key(s) or components thereof match or substantially match the stored key(s) or components thereof accessible to the data player for authentication purposes.

Figure 26:
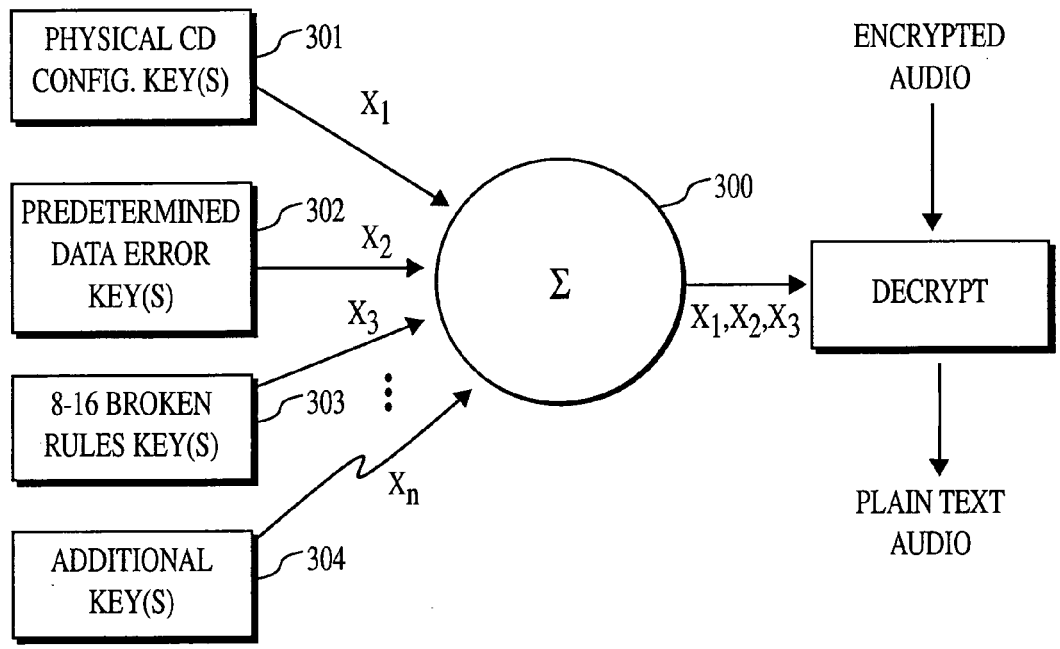
FIG. 26 is another embodiment showing the use of various keys to build a combination key or keys in accordance with the present invention.

FIG. 26 is an illustration of another embodiment showing the use of various keys to build a combination key or keys in accordance with the present invention. Here, a combiner 300 is included to build an authentication key based on discrete components. An authentication key 301, based on a physical characteristics of a data disc, such as a CD, may comprise one component of an authentication key. Additional authentication keys, such as key 302 derived from embedding predetermined errors in a disc, or key 303 composed of an eight-to-sixteen modulation broken rule key, may comprise other components of the same or different authentication key or keys. Any number of additional keys 304 may also be included. Moreover, if an addition key 304 is an embedded signaling key, it is not lost, because it always travel with the audio, whether the audio data is encrypted or not.

Thus, a pirate has two potential situations. First, if all the authentication keys were lost, a pirate could take the audio safe from the analog domain, redigitize it, and create from scratch an authentication key, data key and embedded key, using a homemade encryption box. The pirate could also have made an audio disc and, using his own rules, manipulate various detectors to attempt playback of the CD; a fairly uncomplicated task.

On the other hand, if the pirate obtains a CD containing physical key 301, predetermined errors data key 302, an eight-to-sixteen modulation broken or modified rule key 303 and an embedded key, as at 304, and redigitizes them to make a unique disc, the pirate has one-third or one whole key already, because embedded key 304 can be deciphered. This means that the pirate must create matching pairs of the three remaining keys 301, 302, 303 in order to decrypt the actual audio on the disc. In short, the task of pirating a CD under this scenario is infinitely more complicated as opposed to under the first scenario where a pirate can merely pass old audio information through an encryption box.

There is an advantage to not losing all or parts of an authentication key or keys. Further, sending one of the keys inaudibly, places additional burden on a pirate in that inaudibility requires a pirate to determine the identify of the inaudible key and produce a matching set of keys and encryption itself on a disc.

As herein described, the present invention considerably increases the degree of difficulty required to pirate a CD or DVD, rather than having all decryption keys lost.

Alternatively, the embedded signaling system, via an embedded key 304, can carry various detectable copyright flags. The advantage of this embodiment is the requirement that each disc player must have an embedded signaling decoder not only in the disc player, but also in the recording or transmission device.

Recall that in general, such devices would not normally handle the actual analog plain text audio, or even the digital plain text audio. Generally, these devices handle encrypted audio data. And in these cases, because the encrypted audio data loses two-thirds of its decryption key(s), the information becomes non-decryptable unless the audio is played on a licensed platform that obeys copying and other rules.

The embedded signaling key, as previously indicated, travels with the analog signal. If both data and key are to be re-digitized and input into a digital recorder, there must be industry agreement that an embedded signal decoder and any decoded signal, for that matter, does not look for the decryption key(s) in the form of an embedded key.

In other words, if an embedded key is obtained by a signal seeking to decrypt the embedded key only, as opposed to a signal seeking to decrypt all embedded, data and physical keys together, then the former signal will be deemed to be a fraudulent signal from whatever source it is derived, and recording will not be triggered.

Indeed, there may be a legal reason to be able to detect on a disc an authorization flag of some sort, and place that flag in the embedded signal, in order to allow a user to record the disc. Alternatively, this method above may be used to prevent a disc recorder from recording. This method may also be used to place a notice on a computer platform, for example, indicating to a user that recording onto a hard drive or floppy disc is prohibited until the user call a particular telephone number and provide credit card information. A nominal charge is optionally made for the purpose.

The many features and advantages of the invention are apparent from the detailed specification. Thus, it is intended by the appended claims to cover all such features and advantages of the invention that fall within the true spirit and scope of the invention. Further, since numerous modifications and variations will readily occur to those skilled in the art, it is not desired to limit the invention to the exact construction and operation illustrated and described. Accordingly, all suitable modifications and equivalents may be resorted to as falling within the scope of the invention.

What is claimed is:

1. A method for authenticating at least one of a media and data stored on said media, in order to prevent at least one of piracy, unauthorized access and unauthorized copying of the data stored on said media, wherein said data stored on said media is modulated via at least one modified modulation rule to generate at least one authentication key or component thereof for authenticating at least one of said media and said data, said method comprising the steps of:
   (a) reading the data from said media;
   (b) detecting the modulation of the at least one modified modulation rule associated with the data;
   (c) deriving an embedded authentication key or component thereof responsive to said detecting step (b);
   (d) comparing the embedded authentication key or component thereof, to at least one authentication key or component thereof;
   (e) authenticating the at least one of said media and said data responsive to said comparing step (d); and
   (f) outputting said data as at least one of audio, video, audio data, video data and digital data substantially free of the modulation of the at least one modified modulation rule.

2. A method according to claim 1, wherein said deriving step (c) derives the embedded authentication key or component thereof as a combination of on-off binary codes representing ones and zeros to represent a predetermined symbol sequence.

3. A method according to claim 1, wherein said outputting step (f) further includes the step of converting said data into a stereo analog signal without transferring, in the data, the modulation of the at least one modulation rule used to derive the embedded authentication key or component thereof.

4. A method according to claim 1, and further including the step of:
   (g) locating at least one modified modulation rule on at least one of a per track basis and interval basis throughout said media such that said authentication step (e) is performed for at least one of each track to be played, throughout playback and throughout recording.

5. A method according to claim 1, wherein said authenticating step (e) further includes a step of authenticating using a different authentication key or component thereof for each disc track.

6. A method according to claim 1, said method comprises the step of authenticating the at least one of the data and the media via at least two different authentication keys, each of which successively must be authenticated before said data is finally output via said outputting step (f).

7. A method according to claim 1, wherein said method authenticates the at least one of the media and the data over a plurality of interconnected computer networks comprising at least one of a local network, global network and the Internet.

8. A method according to claim 1, wherein said authenticating step (e) further includes a step of using at least three different sources for compiling compound authentication keys.

9. A method according to claim 1 wherein said deriving step (c) further comprises the step of at least one of decoding and decrypting the embedded authentication key or component thereof for subsequent authentication.

10. A method according to claim 1 wherein said comparing step (d) further comprises the step of comparing the at least one modified modulation rule comprising the at least one authentication key or component thereof, to at least one lookup table of valid modified modulation rule output values comprising the at least one authentication key or component thereof.

11. A data disc for authenticating at least one of said data disc and data stored on said media data disc, in order to prevent at least one of piracy, unauthorized access and unauthorized copying of the data stored on said data disc, the data disc comprising at least one modified modulation rule comprising at least one authentication key or component thereof for authenticating at least one of said data disc and said data, wherein said at least one of said data disc and said data may be outputted in at least one of an analog and audio form substantially error free and free of said at least one modified modulation rule by at least one of an error removal process and said at least one authentication key or component thereof, thereby allowing a user to experience said data without experiencing said modulation rules removed therefrom via said error removal process.

12. The data disc of claim 11, wherein said at least one modified modulation rule is located on at least one of a per track basis and interval basis throughout said data disc such that authenticating is performed for at least one of each track to be played throughout playback and throughout recording.

13. The data disc of claim 11, wherein authentication occurs using a different authentication key or component thereof for each disc track.

14. The data disc of claim 11, wherein authentication occurs using at least two different authentication key, each of which must be successively authenticated before said data is output.

15. The data disc of claim 11, wherein authentication occurs using at least three different sources for compiling compound authentication keys.

16. The data disc of claim 11, wherein authentication occurs via decoding or decrypting the embedded authentication key or component thereof for subsequent authentication.

17. In a method for authenticating at least one of a media and data stored on said media, in order to prevent at least one of piracy, unauthorized access and unauthorized copying of the data stored on said media, wherein said data stored on said media is modulated via at least one modified modulation rule to generate at least one authentication key or component thereof for authenticating at least one of said media and said data, a data player comprising a data processor performing the steps of:

(a) reading the data from said media;
(b) detecting the modulation of the at least one modified modulation rule associated with the data;
(c) deriving an embedded authentication key or component thereof responsive to said detecting step (b);
(d) comparing the embedded authentication key or component thereof, to at least one authentication key or component thereof;
(e) authenticating at least one of said media and said data responsive to said comparing step (d); and
(f) outputting said data as at least one of audio, video, audio data, video data and digital data substantially free of the modulation of the at least one modified modulation rule.

18. The data processor of claim 17, wherein said step of deriving includes deriving the embedded authentication key or component thereof as a combination of on-off binary codes representing ones and zeros to represent a predetermined symbol sequence.

19. The data processor of claim 17, wherein said step of outputting includes converting said data into a stereo analog signal without transferring, in the data, the modulation of the at least one modulation rule used to derive the embedded authentication key or component thereof.

20. The data processor of claim 17, wherein said data processor further performs the step of locating at least one modified modulation rule on at least one of a per track basis and interval basis throughout said media such that said authenticating authenticates for at least one of each track to be played throughout playback and throughout recording.

21. The data processor of claim 17, wherein said step of authenticating further includes authenticating using a different authentication key or component thereof for each disc track.

22. The data processor of claim 17, wherein said step of authenticating further includes authenticating using at least two different authentication key, each of which must be successively authenticated before said data is output.

23. The data processor of claim 17, wherein said step of authenticating further includes authenticating using at least three different sources for compiling compound authentication keys.

24. The data processor of claim 17, wherein said step of authenticating further includes at least one of decoding or decrypting the embedded authentication key or component thereof for subsequent authentication.

25. The data processor of claim 17, wherein said step of comparing further includes comparing the at least one modified modulation rule to at least one lookup table of valid modified modulation rule output values comprising the at least one authentication key or component thereof.

26. A data storing device for authenticating at least one of said data storing device and data to be stored on said data storing device, in order to prevent at least one of piracy, unauthorized access and unauthorized copying of the data stored on said data storing device, the data storing device comprising at least one modified modulation rule to generate at least one authentication key or component thereof for authenticating at least one of said data storing device and said data, and wherein the modified modulation rule cannot be readily altered, obscured nor removed from said data without simultaneously degrading or impairing a quality of an audible component of said data, and wherein the data is transmitted substantially free of the modified modulation rule thereby preventing a destination processor from reading and subsequently authenticating said data.

27. The data storing device of claim 26, wherein said at least one modified modulation rule is located on at least one of a per track basis and interval basis throughout said data storing device such that authenticating is performed for at least one of each track to be played throughout playback and throughout recording.

28. The data storing device of claim 26, wherein authentication occurs using a different authentication key or component thereof for each disc track.

29. The data storing device of claim 26, wherein authentication occurs using at least two different authentication key, each of which must be successively authenticated before said data is output.

30. The data storing device of claim 26, wherein authentication occurs using at least three different sources for compiling compound authentication keys.

31. The data storing device of claim 26, wherein authentication occurs via decoding or decrypting the embedded authentication key or component thereof for subsequent authentication.

32. A system for authenticating at least one of a media and data stored on said media, in order to prevent at least one of piracy, unauthorized access and unauthorized copying of the data stored on said media, wherein said data stored on said media is modulated via at least one modified modulation rule to generate at least one authentication key or component thereof for authenticating at least one of said media and said data, wherein said at least one of said media and said data may be outputted in an analog and/or audio form substantially error free and free of said at least one modified modulation rule by at least one of an error removal process and said at least one authentication key or component thereof, said system including a data player containing a data processor comprising lookup table means for authenticating said at least one of said media and said data and for intentionally breaking standard modulation rules by which bit patterns are recorded as one or more symbol sequences on a data media, said lookup table means connected to a focus servo, tracking servo, laser, lens and mirror, together comprising a portion of a disc reader housed in a data player device.

33. The system of claim 32, wherein said at least one modified modulation rule is located on at least one of a per track basis and interval basis throughout said media such that authenticating is performed for at least one of each track to be played throughout playback and throughout recording.

34. The system of claim 32, wherein authentication occurs using a different authentication key or component thereof for each disc track.

35. The system of claim 32, wherein authentication occurs using at least two different authentication key, each of which must be successively authenticated before said data is output.

36. The system of claim 32, wherein authentication occurs using at least three different sources for compiling compound authentication keys.

37. The system of claim 32, wherein authentication occurs via decoding or decrypting the embedded authentication key or component thereof for subsequent authentication.

38. A system for authenticating at least one of a media and data stored on said media, in order to prevent at least one of piracy, unauthorized access and unauthorized copying of the data stored on said media, wherein said data stored on said media is modulated via at least one modified modulation rule to generate at least one authentication key or component thereof for authenticating at least one of said media and said data, wherein said at least one of said media and said data may be outputted in an analog and/or audio form substantially error free and free of said at least one modified modulation rule by at least one of an error removal process and said at least one authentication key or component thereof, said system including a data player containing a data processor comprising a lookup table used by said data processor in intentionally modifying at least one modulation rule by which at least one bit indicative of said modifying is generated as at least one symbol used by said system to authenticate said at least one of said media and said data stored on said media.

39. The system of claim 38, wherein said at least one modified modulation rule is located on at least one of a per track basis and interval basis throughout said media such that authenticating is performed for at least one of each track to be played throughout playback and throughout recording.

40. The system of claim 38, wherein authentication occurs using a different authentication key or component thereof for each disc track.

41. The system of claim 38, wherein authentication occurs using at least two different authentication key, each of which must be successively authenticated before said data is output.

42. The system of claim 38, wherein authentication occurs using at least three different sources for compiling compound authentication keys.

43. The system of claim 38, wherein authentication occurs via decoding or decrypting the embedded authentication key or component thereof for subsequent authentication.

44. A system for authenticating at least one of a media and data stored on said media, in order to prevent at least one of piracy, unauthorized access and unauthorized copying of the data stored on said media, wherein said data stored on said media is modulated via at least one modified modulation rule to generate at least one authentication key or component thereof for authenticating at least one of said media and said data, said system comprising:

means for reading the data from said media;
means for detecting the modulation of the at least one modified modulation rule associated with the data;
means for deriving an embedded authentication key or component thereof responsive to said means for detecting;
means for comparing the embedded authentication key or component thereof, to at least one authentication key or component thereof;
means for authenticating the at least one of said media and said data responsive to said means for comparing; and
means for outputting said data as at least one of audio, video, audio data, video data and digital data substantially free of the modulation of the at least one modified modulation rule.

45. The system of claim 44, wherein said means for deriving includes means for deriving the embedded authentication key or component thereof as a combination of on-off binary codes representing ones and zeros to represent a predetermined symbol sequence.

46. The system of claim 44, wherein said means for outputting includes means for converting said data into a stereo analog signal without transferring, in the data, the modulation of the at least one modulation rule used to derive the embedded authentication key or component thereof.

47. The system of claim 44, further comprising means for locating at least one modified modulation rule on at least one of a per track basis and interval basis throughout said media such that said means for authenticating authenticates for at least one of each track to be played throughout playback and throughout recording.

48. The system of claim 44, wherein said means for authenticating further includes means for authenticating using a different authentication key or component thereof for each disc track.

49. The system of claim 44, wherein said means for authenticating further includes means for authenticating using at least two different authentication key, each of which must be successively authenticated before said data is output.

50. The system of claim 44, wherein said means for authenticating further includes means for authenticating using at least three different sources for compiling compound authentication keys.

51. The system of claim 44, wherein said means for authenticating further includes at least one of means for decoding or decrypting the embedded authentication key or component thereof for subsequent authentication.

52. The system of claim 44, wherein said means for comparing further includes means for comparing the at least one modified modulation rule to at least one lookup table of valid modified modulation rule output values comprising the at least one authentication key or component thereof.

* * * * *